US009786964B2

(12) United States Patent
Takeuchi et al.

(10) Patent No.: US 9,786,964 B2
(45) Date of Patent: *Oct. 10, 2017

(54) REFRIGERATION CYCLE DEVICE FOR AUXILIARY HEATING OR COOLING

(71) Applicant: DENSO CORPORATION, Kariya, Aichi-pref. (JP)

(72) Inventors: Masayuki Takeuchi, Nukata-gun (JP); Takashi Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/440,727

(22) PCT Filed: Oct. 2, 2013

(86) PCT No.: PCT/JP2013/005863
§ 371 (c)(1),
(2) Date: May 5, 2015

(87) PCT Pub. No.: WO2014/073151
PCT Pub. Date: May 15, 2014

(65) Prior Publication Data
US 2015/0295285 A1    Oct. 15, 2015

(30) Foreign Application Priority Data

Nov. 7, 2012  (JP) ................. 2012-245645

(51) Int. Cl.
*F25B 1/00*    (2006.01)
*H01M 10/613*    (2014.01)
(Continued)

(52) U.S. Cl.
CPC ...... *H01M 10/613* (2015.04); *B60H 1/00278* (2013.01); *B60H 1/00899* (2013.01);
(Continued)

(58) Field of Classification Search
CPC ............ B60H 1/00278; B60H 1/00271; B60H 2001/00307; B60H 1/143; B60H 1/22;
(Continued)

(56) References Cited

U.S. PATENT DOCUMENTS

2012/0241139 A1* 9/2012 Katoh ................... F28D 1/0426
165/202
2013/0199217 A1* 8/2013 Arai .................... B60H 1/00278
62/79

FOREIGN PATENT DOCUMENTS

JP    H09072625 A    3/1997
JP    2002313441 A    10/2002
(Continued)

OTHER PUBLICATIONS

International Search Report and Written Opinion (in Japanese with English Translation) for PCT/JP2013/005863, mailed Dec. 24, 2013; ISA/JP.

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

In an operation mode for heating battery air, a refrigerant passage switching portion switches over to a first refrigerant passage in which a refrigerant including gas refrigerant flowing out of an interior condenser flows into an auxiliary heat exchanger through a first pipe having a relatively large passage cross-sectional area and a liquid refrigerant flowing out of the auxiliary heat exchanger flows to an inlet of an exterior heat exchanger through a second pipe having a relatively small passage cross-sectional area. Meanwhile, in an operation mode for cooling the battery air, the refrigerant passage switching portion switches over to a second refrigerant passage in which a liquid refrigerant flowing out of the exterior heat exchanger flows into the auxiliary heat
(Continued)

BATTERY HEATING MODE exchanger through the second pipe and a gas refrigerant flowing out of the auxiliary heat exchanger flows to a suction port of a compressor through the first pipe.

10 Claims, 18 Drawing Sheets

(51) Int. Cl.
    *F25B 5/00*     (2006.01)
    *F25B 6/00*     (2006.01)
    *F25B 49/02*     (2006.01)
    *B60H 1/00*     (2006.01)
    *B60L 1/00*     (2006.01)
    *B60L 1/02*     (2006.01)
    *B60L 3/00*     (2006.01)
    *B60L 11/18*     (2006.01)

(52) U.S. Cl.
CPC .......... *B60H 1/00921* (2013.01); *B60L 1/003* (2013.01); *B60L 1/02* (2013.01); *B60L 3/003* (2013.01); *B60L 3/0023* (2013.01); *B60L 3/0061* (2013.01); *B60L 11/1803* (2013.01); *B60L 11/1874* (2013.01); *B60L 11/1875* (2013.01); *F25B 5/00* (2013.01); *F25B 6/00* (2013.01); *F25B 49/02* (2013.01); *B60H 2001/00307* (2013.01); *B60L 2240/34* (2013.01); *B60L 2240/36* (2013.01); *B60L 2240/425* (2013.01); *B60L 2240/445* (2013.01); *B60L 2240/525* (2013.01); *B60L 2240/545* (2013.01); *B60L 2240/662* (2013.01); *F25B 2341/0662* (2013.01); *F25B 2600/2507* (2013.01); *F25B 2700/195* (2013.01); *F25B 2700/1931* (2013.01); *F25B 2700/21152* (2013.01); *F25B 2700/21163* (2013.01); *F25B 2700/21175* (2013.01); *Y02T 10/642* (2013.01); *Y02T 10/7005* (2013.01); *Y02T 10/705* (2013.01); *Y02T 10/7291* (2013.01); *Y02T 90/16* (2013.01)

(58) Field of Classification Search
CPC .... B60H 1/32; B60L 11/1874; B60L 11/1875; H01M 10/60; F25B 5/02
See application file for complete search history.

(56) References Cited

FOREIGN PATENT DOCUMENTS

| JP | 2004078440 A | 3/2004 | |
|---|---|---|---|
| JP | 2008308080 A | 12/2008 | |
| JP | 2012172849 A | 9/2012 | |
| JP | 2013217631 A | 10/2013 | |
| WO | WO 2012046594 A1 * | 4/2012 | ......... B60H 1/00278 |
| WO | WO 2012143778 A1 * | 10/2012 | ......... B60H 1/00278 |
| WO | WO-2013136693 A1 | 9/2013 | |

* cited by examiner

COOLING/BATTERY COOLING MODE

COOLING MODE

BATTERY COOLING MODE

HEATING/BATTERY HEATING MODE

HEATING MODE

BATTERY HEATING MODE

HEATING/BATTERY COOLING MODE

COOLING/BATTERY COOLING MODE

BATTERY COOLING MODE

HEATING/BATTERY HEATING MODE

BATTERY HEATING MODE

HEATING/BATTERY COOLING MODE

COOLING/BATTERY COOLING MODE

COOLING MODE

COOLING/BATTERY COOLING MODE

HEATING/BATTERY HEATING MODE

REFRIGERATION CYCLE DEVICE FOR AUXILIARY HEATING OR COOLING

CROSS REFERENCE TO RELATED APPLICATIONS

This application is a U.S. National Phase Application under 35 U.S.C. 371 of International Application No. PCT/JP2013/005863 filed on Oct. 2, 2013 and published in Japanese as WO 2014/073151 A1 on May 15, 2014. This application is based on and claims the benefit of priority from Japanese Patent Application No. 2012-245645 filed on Nov. 7, 2012. The entire disclosures of all of the above applications are incorporated herein by reference.

FIELD OF THE INVENTION

The present disclosure relates to a refrigeration cycle device that regulates temperatures of a plurality of temperature regulation targets.

BACKGROUND ART

Conventionally, in motor-driven vehicles such as electric vehicles and hybrid vehicles, electric power stored in a condenser such as a secondary battery is supplied to an electric motor through an inverter or the like so that driving force for traveling the vehicles is output. When temperatures of electrical machines such as the secondary battery, the inverter, and the electric motor are increased due to self-heating or the like, the electrical machines may be malfunctioned and damaged. Therefore, the motor-driven vehicles require a temperature regulation portion to cool the electrical machines.

For example, Patent Document 1 discloses an example in which a vapor compression type refrigeration cycle device for cooling air (ventilation air) blown into a vehicle interior is used as a temperature regulation portion for cooling an electric machine in a vehicle air conditioning system. In more detail, the refrigeration cycle device in Patent Document 1 includes two evaporators which are interconnected in parallel such that air is cooled by one of the evaporators and a heating medium for cooling the electric machine is cooled by the other of the evaporators.

In other words, the refrigeration cycle device in Patent Document 1 is configured to regulate temperatures of two types of temperature regulation targets such as air (first temperature regulation target) and a heating medium (second temperature regulation target).

CITATION LIST

Patent Document

Patent Document 1:
  Japanese Unexamined Patent Application Publication No. 2002-313441

SUMMARY OF INVENTION

According to the examination of the present inventors, the above-mentioned electric machines also include an electric machine which does not exhibit sufficient performance when having a low temperature. For example, when the temperature of the secondary battery is decreased, the secondary battery has poor input/output characteristics. For this reason, when the secondary battery is used under a low temperature environment in which the secondary battery cannot be warmed up by self-heating or the like, the secondary battery may not output sufficient power and not charge sufficient regenerative power.

Accordingly, the temperature regulation portion for the electric machine applied to the motor-driven vehicle requires a function of heating the electric machine to regulate the temperature of the electric machine within a predetermined temperature range, in addition to the simple function of cooling the electric machine. However, since the refrigeration cycle device in Patent Document 1 has only a function of cooling the heating medium, the refrigeration cycle device cannot regulate the temperature of the electric machine within a predetermined temperature range under the low temperature environment.

As a countermeasure to this matter, the present inventors first proposes that a refrigeration cycle device of a vehicle air conditioning system is used as a temperature regulation portion for regulating a temperature of an electric machine within a predetermined temperature range in Japanese Patent Application No. 2012-176873 (hereinafter, referred to as "a comparative example").

Specifically, the refrigeration cycle device in the comparative example is to add one auxiliary heat exchanger for performing temperature regulation of a heating medium (second temperature regulation target) for regulating a temperature of an electric machine to the refrigeration cycle device of the vehicle air conditioning system. The refrigeration cycle device in the comparative example can regulate the temperature of the electric machine within a predetermined temperature range by individually supplying the one auxiliary heat exchanger with a high-temperature and high-pressure refrigerant during heating of the electric machine and a low-temperature and low-pressure refrigerant during cooling of the electric machine.

However, the refrigeration cycle device in the comparative example has the following matters.

That is, in the refrigeration cycle device of the vehicle air conditioning system, a cycle component such as a compressor, an exterior heat exchanger, or an accumulator is typically disposed in front of the vehicle. Meanwhile, an electric machine such as a second battery is disposed under an occupant floor in the center of the vehicle or behind the vehicle, for example, beneath a rear sheet or a trunk, in order to secure a mounting space. For this reason, a pipe from the cycle component disposed in front of the vehicle to the auxiliary heat exchanger is long, and the pipe has a one-way length of about 5 m according to arrangement thereof.

In addition, a refrigerant in a refrigeration cycle performs heat transportation by a phase change between liquid (a liquid refrigerant) and gas (a gas refrigerant), but a density difference between the liquid refrigerant and the gas refrigerant is large. Therefore, it is necessary to decrease an inner diameter of a liquid refrigerant pipe, namely, a passage cross-sectional area of the liquid refrigerant pipe in order to reduce a required refrigerant amount. In this connection, the density of the liquid refrigerant is about 10 times that of the gas refrigerant. Meanwhile, since the gas refrigerant has a large pressure loss when flowing through the refrigerant pipe compared to the liquid refrigerant, it is necessary to increase a passage cross-sectional area of a gas refrigerant pipe in order to reduce the pressure loss.

In the refrigeration cycle device in the comparative example, refrigerant flow directions in two refrigerant pipes communicating with the auxiliary heat exchanger are equal to each other when the electric machine is heated and cooled. For this reason, it is impossible to decrease a passage cross-sectional area of one refrigerant pipe and increase a passage cross-sectional area of the other refrigerant pipe.

In detail, the refrigeration cycle device in the comparative example includes a going-pipe which communicates with a refrigerant inlet of the auxiliary heat exchanger so that a refrigerant flowing into the auxiliary heat exchanger flows through the pipe, and a returning-pipe which communicates with a refrigerant outlet of the auxiliary heat exchanger so that a refrigerant flowing out of the auxiliary heat exchanger flows through the pipe. When the electric machine is heated, a gas refrigerant flows in the going-pipe and a liquid refrigerant flows in the returning-pipe. When the electric machine is cooled on the other hand, the liquid refrigerant flows in the going-pipe and the gas refrigerant flows in the returning-pipe. For this reason, it is necessary to increase passage cross-sectional areas of both going and returning pipes in order to suppress the pressure loss of the refrigerant. However, internal volumes of both pipes are also increased, thereby causing a refrigerant filling amount to be increased or a refrigerant variation amount for each operation mode to be increased. On the contrary, when the passage cross-sectional areas of both going and returning pipes are decreased in order to suppress the refrigerant filling amount or the refrigerant variation amount, the pressure loss of refrigerant is increased. In addition, the increase in the refrigerant filling amount results in increase of a refrigerant cost and the increase in the refrigerant variation amount results in increase of an accumulator capacity. In addition, the increase in the pressure loss of refrigerant results in performance deterioration of a refrigeration cycle.

The present disclosure has been made in view of the above matters, and an object thereof is to provide a refrigeration cycle device having a configuration in which one auxiliary heat exchanger is used in common when a second temperature regulation target is cooled and heated, in order to achieve both of suppression of increase in a refrigerant filling amount and a refrigerant variation amount and suppression of increase in a pressure loss of a refrigerant.

To achieve the above abject, a refrigeration cycle device of the present disclosure includes a compressor compressing and discharging a refrigerant, an exterior heat exchanger exchanging heat between the refrigerant discharged from the compressor and outside air and causing the refrigerant to flow to a suction port of the compressor, a utilization-side heat exchanger exchanging heat between one of the refrigerant discharged from the compressor and the refrigerant flowing out of the exterior heat exchanger and a first temperature regulation target, an auxiliary heat exchanger exchanging heat between a refrigerant and a second temperature regulation target, a first pipe communicating with the auxiliary heat exchanger and having a larger passage cross-sectional area than a predetermined value, a second pipe communicating with the auxiliary heat exchanger and having a smaller passage cross-sectional area than that of the first pipe, and a refrigerant passage switching portion switching a refrigerant passage of the refrigerant circulated in a cycle.

the refrigerant passage switching portion is configured at least to switch (i) a first refrigerant passage, in which a refrigerant in a range reaching an inlet of the exterior heat exchanger from a discharge port of the compressor flows into the auxiliary heat exchanger through the first pipe and a refrigerant flowing out of the auxiliary heat exchanger flows to the inlet of the exterior heat exchanger through the second pipe, and (ii) a second refrigerant passage, in which a refrigerant in a range reaching the suction port of the compressor from an outlet of the exterior heat exchanger flows into the auxiliary heat exchanger through the second pipe and a refrigerant flowing out of the auxiliary heat exchanger flows to the suction port of the compressor through the first pipe.

According to the exemplary present disclosure, the liquid refrigerant flows through the second pipe having a relatively small passage cross-sectional area and the gas refrigerant flows through the first pipe having a relatively large passage cross-sectional area even in either of cooling and heating of a second temperature regulation target. Accordingly, both of suppression of increase in a refrigerant filling amount and a refrigerant variation amount and suppression of increase in a pressure loss of a refrigerant can be achieved.

DESCRIPTION OF EMBODIMENTS

Figure 1:
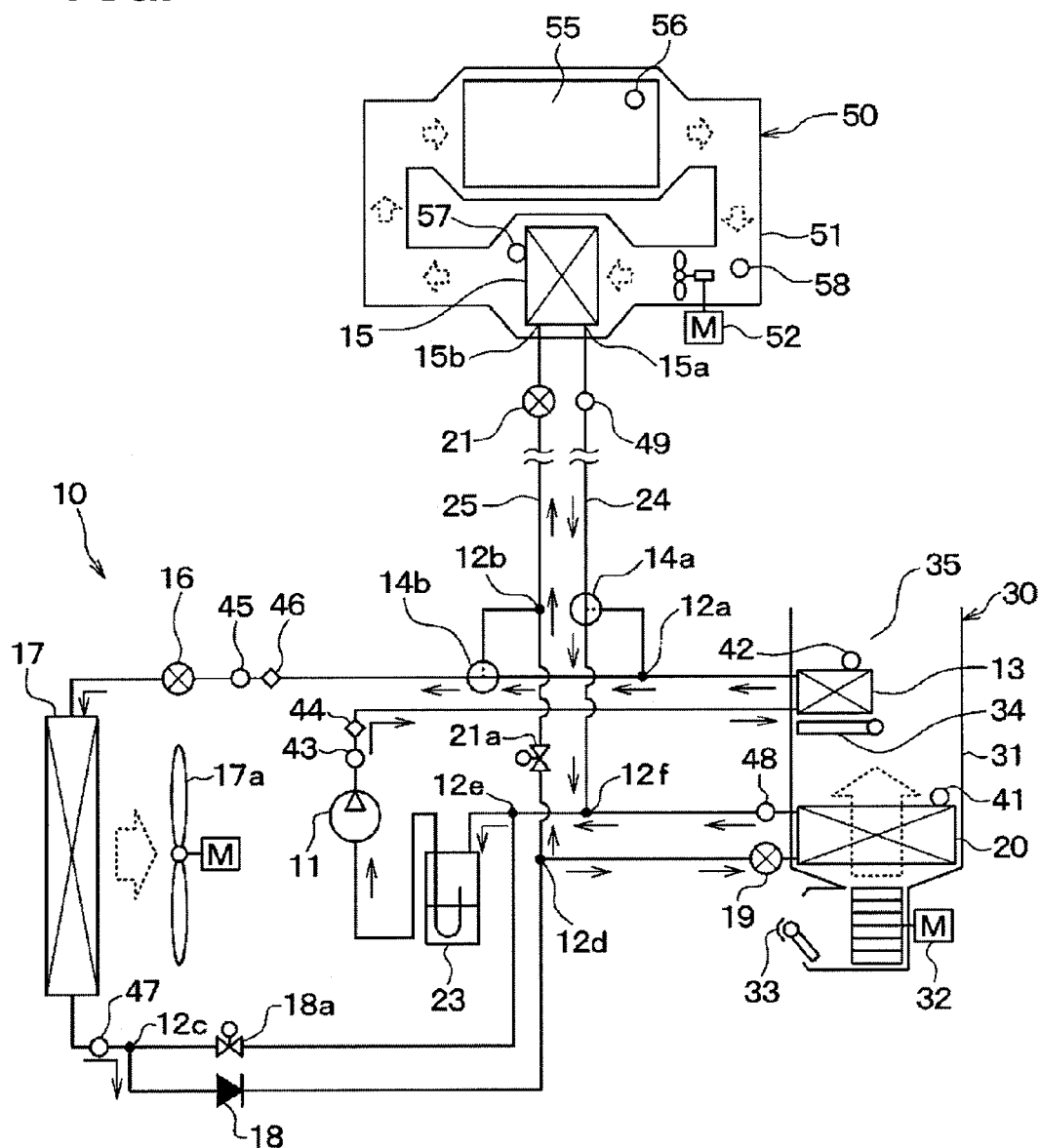
FIG. 1 is a diagram illustrating an overall configuration of a refrigerant flow in a cooling/battery cooling operation mode of a refrigeration cycle device according to a first embodiment.

Hereinafter, exemplary embodiments of the present disclosure will be described with reference to the drawings. Throughout the disclosure, like reference numerals refer to like parts throughout the various drawings and embodiments of the present disclosure.

First Embodiment

A first embodiment of the present disclosure will be described with reference to FIGS. 1 to 7. In the first embodiment, a refrigeration cycle device 10 is applied to an electric vehicle which obtains driving power for traveling of the vehicle from a traveling electric motor. Furthermore, in the electric vehicle, the refrigeration cycle device 10 is used to perform air conditioning (cooling and heating) of a vehicle interior and temperature regulation (heating and cooling) of a secondary battery 55 as a condenser which stores electric power supplied to the traveling electric motor.

In more detail, the refrigeration cycle device 10 performs a function of regulating a temperature of inside air (inside ventilation air) blown into the vehicle interior and a function of regulating a temperature of battery air (battery ventilation air) blown toward the secondary battery 55. In other words, the refrigeration cycle device 10 regulates temperatures of a plurality of temperature regulation targets such as inside air (first temperature regulation target) and battery air (second temperature regulation target).

A compressor 11 among components of the refrigeration cycle device 10 is arranged in a bonnet of the vehicle, and serves to introduce, compress, and then discharge a refrigerant in the refrigeration cycle apparatus 10. The compressor 11 is configured as an electric compressor which rotatably drives a fixed displacement type compression mechanism having a fixed discharge capacity by an electric motor. An operation (rotation speed) of the electric motor of the compressor 11 is controlled by control signals output from a controller to be described later.

In addition, the refrigeration cycle device 10 adopts an HFC refrigerant (specifically, R134a) as the refrigerant and forms a vapor compression type subcritical refrigeration cycle in which a high-pressure side refrigerant pressure does not exceed a critical pressure of the refrigerant. Moreover, the refrigerant is mixed with refrigerating machine oil for lubricating the compressor 11 and a portion of the refrigerating machine oil is circulated in the cycle, together with the refrigerant.

A refrigerant inlet of the interior condenser 13 is connected to a discharge port of the compressor 11. The interior condenser 13 is arranged in a casing 31 forming an air passage for inside air in an interior air conditioning unit 30. Moreover, the interior condenser (utilization-side heat exchanger) 13 forms a radiating heat exchanger in which the refrigerant discharged from the compressor 11 exchanges heat with inside air after passing through an interior evaporator 20 to be described later so as to radiate heat. In addition, the interior air conditioning unit 30 will be described in detail later.

A refrigerant inlet of an exterior heat exchanger 17 is connected to a refrigerant outlet of the interior condenser 13 through a first connection portion 12a configured as a three-way joint, a second three-way valve 14b, and a heating expansion valve 16. The first connection portion 12a and the second three-way valve 14b are to connect an auxiliary heat exchanger 15 to be described later.

The heating expansion valve 16 is a pressure reducer which decompresses the refrigerant flowing out of the interior condenser 13 when the vehicle interior is heated by heating inside air. The heating expansion valve 16 is an electric expansion valve which includes a valve body configured to be capable of changing an opening degree (valve opening degree) and an electric actuator consisting of a stepping motor for changing the opening degree (valve opening degree) of the valve body. An operation of the heating expansion valve 16 is controlled by the control signals output from the controller. The heating expansion valve 16 has a full opening function of exhibiting no decompression action by fully opening the opening degree (throttle opening degree) of the valve body.

An exterior heat exchanger 17 is disposed in the bonnet of the vehicle and exchanges heat between the refrigerant flowing therein and outside air blown from a blower fan 17a. In more detail, the exterior heat exchanger 17 functions as an evaporator which evaporates a low-pressure refrigerant to exhibit heat absorption action when the vehicle interior is heated by heating inside air, and functions as a radiator which radiates heat from a high-pressure refrigerant when the vehicle interior is cooled by cooling inside air. The blower fan 17a is an electric blower, an operating ratio, namely, a rotation speed (air flow rate) of which is controlled by control voltages output from the controller.

A refrigerant inlet of an interior evaporator 20 is connected to an outlet of the exterior heat exchanger 17 through a third connection portion 12c configured as a three-way joint, a check valve 18, a fourth connection portion 12d configured as a three-way joint, and a cooling expansion valve 19.

The check valve 18 allows only the flow of the refrigerant from the third connection portion 12c (the refrigerant outlet of the exterior heat exchanger 17) to the fourth connection portion 12d (the refrigerant inlet of the interior evaporator 20 or the refrigerant inlet of the auxiliary heat exchanger 15). Thus, the refrigerant is prevented from flowing backward from the refrigerant inlet of the interior evaporator 20 or the refrigerant inlet of the auxiliary heat exchanger 15 to the refrigerant outlet of the exterior heat exchanger 17 by the check valve 18.

The cooling expansion valve 19 is a pressure reducer which decompresses the refrigerant flowing out of the exterior heat exchanger 17 and flowing into the interior evaporator 20 when the vehicle interior is cooled by cooling inside air. The cooling expansion valve 19 is an electric expansion valve having the same configuration as the heating expansion valve 16. The cooling expansion valve 19 has a full closing function of closing a refrigerant passage by fully closing the opening degree of the valve body, in addition to the full opening function. Therefore, the cooling expansion valve 19 forms a refrigerant passage switching portion which switches the refrigerant passage of the refrigerant circulated in the cycle.

The interior evaporator 20 is arranged further upstream in the air flow direction than the interior condenser 13 in the casing 31 of the interior air conditioning unit 30. The interior evaporator (utilization-side heat exchanger) 20 is an evaporating heat exchanger which evaporates a refrigerant by exchanging heat between the refrigerant decompressed at the cooling expansion valve 19 and the inside air. An inlet of an accumulator 23 is connected to a refrigerant outlet of the interior evaporator 20 through a sixth connection portion 12f configured as a three-way joint and a fifth connection portion 12e configured as a three-way joint.

The accumulator 23 is a gas-liquid separator which separates the refrigerant flowing into the inside thereof into gas phase refrigerant and liquid phase refrigerant to store an excess refrigerant in the cycle. A suction side of the compressor 11 is connected to a gas phase refrigerant outlet of the accumulator 23. Accordingly, the accumulator 23 suppresses a liquid phase refrigerant from being introduced into the compressor 11 to perform a function of preventing liquid compression of the compressor 11.

A bypass passage for allowing the refrigerant flowing out of the exterior heat exchanger 17 to flow by bypassing the interior evaporator 20 is connected to the third connection portion 12c between the exterior heat exchanger 17 and the check valve 18 and the fifth connection portion 12e between the interior evaporator 20 and the accumulator 23. A bypass on/off valve 18a is provided on the bypass passage.

The bypass on/off valve 18a is an electromagnetic valve, an on/off operation of which is controlled by the control voltages output from the controller. The refrigerant flowing out of the exterior heat exchanger 17 is introduced into the accumulator 23 through the fifth connection portion 12e when the bypass on/off valve 18a is opened, and the refrigerant flowing out of the exterior heat exchanger 17 is introduced into the fourth connection portion 12d through the check valve 18 when the bypass on/off valve 18a is closed. Thus, the bypass on/off valve 18a forms a refrigerant passage switching portion.

The auxiliary heat exchanger 15 of the components of the refrigeration cycle device 10 is arranged in a battery pack 50 forming an air passage for battery air blown toward a secondary battery 55, and regulates temperature of the battery air by exchanging heat between the refrigerant flowing in the battery pack and the battery air. The battery pack 50 will be described in detail later.

The auxiliary heat exchanger 15 has a first entrance port 15a and a second entrance port 15b through which the refrigerant is introduced and discharged. The auxiliary heat exchanger 15 is configured such that the refrigerant flows in the auxiliary heat exchanger 15 from one of the first and second entrance ports 15a and 15b to the other thereof.

In the auxiliary heat exchanger 15, the first entrance port 15a communicates with a first pipe 24, and the second entrance port 15b communicates with a second pipe 25 through a battery expansion valve 21. When comparing the first and second pipes 24 and 25, the first pipe 24 has a large passage cross-sectional area and the second pipe 25 has a small passage cross-sectional area. For example, the first pipe 24 has a circular passage cross-section and adopts a passage having an inner diameter of 10.3 mm, and the second pipe 25 has a circular passage cross-section and adopts a passage having an inner diameter of 6 mm.

The first pipe 24 is connected to the first connection portion 12a and the sixth connection portion 12f through the first three-way valve 14a. The first three-way valve 14a switches a refrigerant passage for connecting the first pipe 24 and the first connection portion 12a and a refrigerant passage for connecting the first pipe 24 and the sixth connection portion 12f. Thus, the first three-way valve 14a forms a refrigerant passage switching portion.

The second pipe 25 is connected to the second three-way valve 14b and the fourth connection portion 12d through the second connection portion 12b. The second three-way valve 14b switches a refrigerant passage for connecting the second pipe 25 and the refrigerant inlet of the exterior heat exchanger 17 and a refrigerant passage for connecting the refrigerant outlet of the interior condenser 13 and the refrigerant inlet of the exterior heat exchanger 17. Thus, the second three-way valve 14b forms a refrigerant passage switching portion for switching the refrigerant passages of the refrigerant circulated in the cycle, similarly to the first three-way valve 14a.

The refrigerant passage for connecting the second connection portion 12b and the fourth connection portion 12d is provided with a battery on/off valve 21a. The battery on/off valve 21a is an electromagnetic valve having the same configuration as the bypass on/off valve 18a. The battery on/off valve 21a may switch the refrigerant passages of the refrigerant circulated in the cycle by opening and closing a refrigerant passage reaching the second pipe 25 from the other refrigerant outlet of the fourth connection portion 12d. Thus, the battery on/off valve 21a forms a refrigerant passage switching portion.

By the first and second three-way valves 14a and 14b and the bypass on/off valve 18a, a first refrigerant passage through which the refrigerant flowing out of the auxiliary heat exchanger 15 is introduced into the inlet of the exterior heat exchanger 17 through the second pipe 25 while the refrigerant flowing out of the interior condenser 13 is introduced into the auxiliary heat exchanger 15 through the first pipe 24, can be switched into a second refrigerant passage through which the refrigerant flowing out of the auxiliary heat exchanger 15 is introduced into the inlet of the accumulator 23 through the first pipe 24 while the refrigerant flowing out of the exterior heat exchanger 17 is introduced into the auxiliary heat exchanger 15 through the second pipe 25.

The battery expansion valve 21 is to decompress the refrigerant flowing into the auxiliary heat exchanger 15 when the secondary battery 53 is cooled by cooling battery air. The battery expansion valve 21 is an electric expansion valve having the same configuration as the heating expansion valve 16, and has a full closing function and a full opening function.

Next, the interior air conditioning unit 30 will be described. Since the interior air conditioning unit 30 serves to blow inside air having a regulated temperature into the vehicle interior, the interior air conditioning unit 30 is arranged inside a dashboard (instrument panel) at the foremost portion of the vehicle interior. Furthermore, the interior air conditioning unit 30 is configured to accommodate the blower 32, the above-mentioned interior condenser 13, the interior evaporator 20, etc. in the casing 31 defining an external appearance of the interior air conditioning unit.

Since the casing 31 forms an air passage for inside air in the vehicle interior, the casing 31 has a certain degree of elasticity and is made of resin having high elasticity. An inside/outside air switching device 33, which switches inside air (vehicle interior air) and outside air (vehicle exterior air) and introduces the same into the casing 31, is arranged at the most upstream side of the inside air in the casing 31.

The inside/outside air switching device 33 is formed with an inside air introduction port through which inside air is introduced into the casing 31, and an exterior air introduction port through which outside air is introduced into the casing 31. Furthermore, an inside/outside air switching door which continuously adjusts opening areas of the inside air introduction port and exterior air introduction port to continuously vary a ratio of air volume between a volume of inside air and a volume of outside air is arranged within the inside/outside air switching device 33.

The blower 32 which blows air introduced through the inside/outside air switching device 33 toward the vehicle interior is arranged downstream of the inside/outside air switching device 33 in the air flow direction thereof. The blower 32 is an electric blower which drives a centrifugal multi-blade fan by an electric motor, and a rotation speed (air flow rate) of the blower 32 is controlled according to the control signals output from the controller.

The interior evaporator 20 and the interior condenser 13 are sequentially arranged downstream of the blower 32 in the air flow direction thereof. In other words, the interior evaporator 20 is arranged upstream of the interior condenser 13 in the inside air flow direction.

In addition, an air mix door 34, which adjusts a ratio of air volume allowing inside air after passing through the interior evaporator 20 to pass through the interior condenser 13, is arranged upstream of the interior condenser 13 in the air flow direction as well as downstream of the interior evaporator 20 in the air flow direction. In addition, a mixing space 35 is provided downstream of the interior condenser 13 in the air flow direction. In the mixing space 35, air which exchanges heat with the refrigerant and is heated by the interior condenser 13 is mixed with air which bypasses the interior condenser 13 and is not heated.

Opening holes, through which the conditioned air mixed in the mixing space 35 is blown into the vehicle interior as an air conditioning target space, are disposed at the most downstream side of the air flow in the casing 31. Specifically, the opening holes include a face opening hole for blowing the conditioned air toward a passenger's upper half body in the vehicle interior, a foot opening hole for blowing the conditioned air toward a passenger's feet, and a defroster opening hole for blowing the conditioned air toward an inside surface of a front window glass of the vehicle (all portions being not shown).

Accordingly, the air mix door 34 adjusts a ratio of volume of air passing through the interior condenser 12, thereby allowing temperature of conditioned air mixed in the mixing space 35 to be regulated so that the temperature of the conditioned air blown from each opening hole is regulated. That is, the air mix door 34 forms a temperature regulation portion which regulates the temperature of the conditioned air blown into the vehicle interior. The air mix door 34 is driven by a servo motor (not shown), an operation of which is controlled by the control signals output from the controller.

In addition, a face door for adjusting an opening area of the face opening hole, a foot door for adjusting an opening area of the foot opening hole, and a defroster door for adjusting an opening area of the defroster opening hole (all doors being not shown) are respectively arranged upstream of the face opening hole, the foot opening hole, and the defroster opening hole in the air flow direction.

The face door, the foot door, and the defroster door are driven by a servo motor (not shown), an operation of which is controlled by the control signals output from the controller, through a link mechanism or the like.

Next, the battery pack 50 will be described. The battery pack 50 is disposed at a bottom surface of the vehicle between a trunk room in the rear of the vehicle and a rear seat, and is configured to form an air passage for circulating and blowing battery air in a metal casing 51 to which electric insulation (for instance, insulation coating) is applied and accommodate a blower 52, the above-mentioned auxiliary heat exchanger 15 and secondary battery 55, etc., in the air passage.

The blower 52 is arranged upstream of the auxiliary heat exchanger 15 in the air flow direction and blows battery air toward the auxiliary heat exchanger 15. The blower 52 is an electric blower, an operating ratio, namely, a rotation speed (air flow rate) of which is controlled by the control voltages output from the controller. The secondary battery 55 is arranged downstream of the auxiliary heat exchanger 15 in the air flow direction, and an air flow downstream side of the secondary battery 55 communicates with a suction port of the blower 52.

Accordingly, when the blower 52 is operated, the battery air having the regulated temperature by the auxiliary heat exchanger 15 is blown so that the temperature of the secondary battery 55 is regulated. In addition, the battery air by which the temperature of the secondary battery 55 is regulated is introduced into the blower 52 to be blown toward the auxiliary heat exchanger 15 again.

Next, an electric control unit of the embodiment will be described. The controller is configured of a known microcomputer including a CPU, a ROM, and a RAM, and peripheral circuits thereof. The controller controls operations of various control target devices 11, 14a, 14b, 16, 17a, 18a, 19, 21, 21a, 32, 52, etc. connected to an output side thereof by executing various operations and processing, based on control programs stored in the ROM.

In addition, an input side of the controller is connected with a group of various control sensors such as an inside air sensor for detecting a vehicle interior temperature Tr, an outside air sensor for detecting an outside air temperature Tam, a solar radiation sensor for detecting an amount of solar radiation Ts radiated into the vehicle interior, an evaporator temperature sensor 41 for detecting a blowout air temperature (evaporator temperature) Te of the interior evaporator 20, a heating blowout temperature sensor 42 for detecting a blowout air temperature of the interior condenser 13, a first refrigerant temperature sensor 43 and first pressure sensor 44 for detecting respective temperature and pressure of the refrigerant flowing out of the compressor 11, a second refrigerant temperature sensor 45 and second pressure sensor 46 for detecting respective temperature and pressure of the refrigerant flowing into the heating expansion valve 16, a third refrigerant temperature sensor 47 for detecting a temperature of the refrigerant flowing out of the exterior heat exchanger 14, a fourth refrigerant temperature sensor 48 for detecting a temperature of the refrigerant flowing out of the interior evaporator 20, a fifth refrigerant temperature sensor 49 for detecting a temperature of the refrigerant flowing out of the first entrance port 15a of the auxiliary heat exchanger 15, a battery temperature sensor 56 for directly detecting a temperature of the secondary battery 55, a first air temperature sensor for battery 57 for detecting a temperature of blowout air in the auxiliary heat exchanger 15, and a second air temperature sensor for battery 58 for detecting a temperature of battery air before flowing into the auxiliary heat exchanger 15.

Although the battery temperature Tb as the temperature of the secondary battery 55 is detected by the battery temperature sensor 56 in the first embodiment, the battery temperature Tb may be indirectly detected by the first and second air temperature sensor for batteries 57 and 58. Thus, the battery temperature sensor 56 and the first and second air temperature sensors for batteries 57 and 58 configure a battery temperature detection portion for detecting the battery temperature Tb. In addition, the battery temperature Tb may be indirectly detected using the detection result of a coolant temperature sensor for detection a temperature of coolant cooling the secondary battery 55 and the outside air temperature sensor.

Furthermore, the input side of the controller is connected with an operation panel (not shown) disposed in the vicinity of the dashboard at the front portion of the vehicle interior, and operation signals from various operation switches provided on the operation panel are input to the input side of the controller. The various operation switches provided on the operation panel include an air conditioning operation switch for requiring the vehicle interior to perform air conditioning, a vehicle interior temperature setting switch for setting a vehicle interior temperature, a switch for selecting air conditioning operation modes, etc.

Here, the controller is integrally formed with a control unit which controls the various control target devices connected to the output side thereof. Configurations (hardware and software) for controlling operations of the respective control target devices form a control unit which controls operations of the respective control target devices.

For example, in the controller, configurations (hardware and software) for controlling the operation of the compressor 11 form a refrigerant discharge capability control unit, and configurations for controlling the operations of the various devices 14a, 14b,18a, 19, and 21a forming the refrigerant passage switching portion form a refrigerant passage switching control unit.

Next, an operation of the refrigeration cycle device 10 with the above configurations will be described. As described above, the refrigeration cycle device 10 may perform air conditioning of the vehicle interior and temperature regulation of the secondary battery 55.

Furthermore, an operation mode for air conditioning of the vehicle interior includes a cooling mode for cooling the vehicle interior and a heating mode for heating the vehicle interior, and an operation mode for temperature regulation of the secondary battery 55 includes a battery heating operation mode for heating the secondary battery 55 and a battery cooling operation mode for cooling the secondary battery 55. The operation modes are switched by execution of a control program which is previously stored in a storage circuit by the controller.

The control program reads operation signals of the operation panel and detection signals of the group of control sensors. A control routine, in which control states of the various control target devices are determined, based on the read detection signals and operation signals and control signals or control voltages are output to the various control target devices such that the determined control states are obtained, is repeated.

In a case in which the operation signals of the operation panel are read, the operation mode when the air conditioning of the vehicle interior is performed is switched to a cooling mode when cooling is selected by the selection switch in a state in which the air conditioning operation switch is closed (ON), and is switched to a heating mode when heating is selected by the selection switch in a state in which the air conditioning operation switch is closed (ON).

In a case in which the detection signals of the group of control sensors are read, the operation mode when the temperature of the secondary battery 55 is regulated is switched to the battery heating operation mode for heating the secondary battery 55 when the battery temperature Tb is equal to or less than a first reference temperature Tk1 (15° C. in the first embodiment), and is switched to the battery cooling operation mode for heating the secondary battery 55 when the battery temperature Tb is equal to or greater than a second reference temperature Tk2 (35° C. in the first embodiment).

Next, an operation of each operation mode will be described.

(a) Cooling/Battery Cooling Operation Mode

The cooling/battery cooling operation mode is an operation mode which simultaneously performs cooling of the vehicle interior and cooling of the secondary battery 55. For example, the operation mode is performed when cooling is selected by the selection switch and when the battery temperature Tb is equal to or greater than the second reference temperature Tk2, in a state in which the operation switch of the operation panel is closed (ON).

In the cooling/battery cooling operation mode, the controller controls the operation of the first three-way valve 14a so as to connect the first pipe 24 and the sixth connection portion 12f, controls the operation of the second three-way valve 14b so as to connect the refrigerant outlet of the interior condenser 13 and the refrigerant inlet of the exterior heat exchanger 17, closes the bypass on/off valve 18a, and opens the battery on/off valve 21a. The controller allows the heating expansion valve 16 to be in a fully opened state, and allows the cooling expansion valve 19 to be in a throttle state in which decompression action is exhibited.

Consequently, in the cooling/battery cooling operation mode, the refrigeration cycle device 10 can switch over to a refrigerant passage in which the refrigerant flows as indicated by the arrow in FIG. 1.

Through the configuration of the refrigerant passage, the controller calculates a target blowout temperature TAO as a target temperature of air blown into the vehicle interior, based on values of the read detection signals and operation signals. Furthermore, the controller determines operation states of various control target devices connected to the output side of the controller, based on the calculated target blowout temperature TAO and the detection signals of the group of sensors.

For example, the refrigerant discharge capability of the compressor 11, namely, the control signals output to the electric motor of the compressor 11 are determined as follows. First, a target evaporator blowout temperature TEO of the interior evaporator 20 is determined based on the target blowout temperature TAO with reference to a control map previously stored in the controller.

Then, the control signals output to the electric motor of the compressor 11 are determined such that a blowout air temperature from the interior evaporator 20 is close to the target evaporator blowout temperature TEO using a feedback control method, based on a deviation between the target evaporator blowout temperature TEO and the blowout air temperature from the interior evaporator 20 detected by the evaporator temperature sensor.

The control voltages output to the electric motor of the blower 32 are determined based on the target blowout temperature TAO with reference to a control map previously stored in the storage circuit.

The control signals output to the cooling expansion valve 19 are determined such that a degree of supercooling of the refrigerant flowing out of the exterior heat exchanger 17 is close to a target degree of supercooling determined such that a coefficient of performance (COP) of the cycle is determined to be about a maximum value, based on the temperature of the refrigerant detected by the third refrigerant temperature sensor 47.

The control signals output to the servo motor of the air mix door 34 are determined such that the air mix door 34 closes the air passage of the interior condenser 13 and a total amount of air after passing through the interior evaporator 20 bypasses the interior condenser 13.

The control signals output to the battery expansion valve 21 are provided such that a degree of superheat of the refrigerant flowing out of the auxiliary heat exchanger 15 is a predetermined degree of superheat, based on the temperature of the refrigerant detected by the fifth refrigerant temperature sensor 49, thereby allowing an opening degree of the battery expansion valve 21 to be determined.

The control signals output to the blower 52 of the battery pack 50 are determined such that the blowing capability of the blower 52 is a predetermined blowing capability. The control signals or the control voltages are output to the control target devices from the controller such that the control states determined as described above are obtained.

Accordingly, in the refrigeration cycle device 10 of the cooling/battery cooling operation mode, the high-pressure refrigerant discharged from the compressor 11 flows into the interior condenser 13. In this case, since the air mix door 34 closes the air passage of the interior condenser 13, the refrigerant flowing into the interior condenser 13 flows out of the interior condenser 13 without substantially radiating heat to air. The refrigerant flowing out of the interior condenser 13 flows into the exterior heat exchanger 17 by passing through the heating expansion valve 16 which is in the fully opened state.

The refrigerant flowing into the exterior heat exchanger 17 is a liquid refrigerant by exchanging heat with outside air blown from the blower fan 17a and radiating heat. The liquid refrigerant flowing out of the exterior heat exchanger 17 flows from the third connection portion 12c to the fourth connection portion 12d through the check valve 18, and is branched and flows from the fourth connection portion 12d to the interior evaporator 20 and the auxiliary heat exchanger 15.

The liquid refrigerant branched to the interior evaporator 20 is decompressed by the cooling expansion valve 19 and then flows into the interior evaporator 20. Then, the liquid refrigerant is evaporated by absorbing heat from the inside air blown by the blower 32. Thereby, the inside air is cooled. The refrigerant flowing out of the interior evaporator 20 flows into the accumulator 23 through the sixth connection portion 12f and the fifth connection portion 12e.

The liquid refrigerant branched from the fourth connection portion 12d to the auxiliary heat exchanger 15 passes through the second pipe 25 and is decompressed until being a low-pressure refrigerant by the battery expansion valve 21. The refrigerant flowing out of the battery expansion valve 21 flows from the second entrance port 15b to the auxiliary heat exchanger 15 and is evaporated by absorbing heat from the battery air blown by the blower 52 to be a gas refrigerant. Thereby, the battery air is cooled. The gas refrigerant flowing out of the first entrance port 15a of the auxiliary heat exchanger 15 passes through the first pipe 24 and flows into the accumulator 23 through the sixth connection portion 12f and the fifth connection portion 12e. Then, the gas refrigerant separated by the accumulator 23 is introduced into the compressor 11 and compressed again.

As described above, in the cooling/battery cooling operation mode, the inside air can be cooled by the interior evaporator 20 so that the vehicle interior is cooled and the battery air can be cooled by the auxiliary heat exchanger 15 so that the secondary battery 55 is cooled.

In this case, the liquid refrigerant flowing into the auxiliary heat exchanger 15 passes through the second pipe 25 having a small passage cross-sectional area, and the gas refrigerant flowing out of the auxiliary heat exchanger 15 passes through the first pipe 24 having a large passage cross-sectional area.

(b) Cooling Operation Mode

The cooling operation mode is an operation mode which performs cooling of the vehicle interior without performing temperature regulation of the secondary battery 55. The operation mode is performed when cooling is selected by the selection switch and when the battery temperature Tb is higher than the first reference temperature Tk1 and is lower than the second reference temperature Tk2, in a state in which the operation switch of the operation panel is closed (ON).

In the cooling operation mode, the controller controls the operation of the first and second three-way valves 14a and 14b and closes the bypass on/off valve 18a, so that the heating expansion valve 16 is in a fully opened state and the cooling expansion valve 19 is in a throttle state, similarly to the cooling/battery cooling operation mode. In addition, the controller closes the battery on/off valve 21a, unlike the cooling/battery cooling operation mode.

Figure 2:
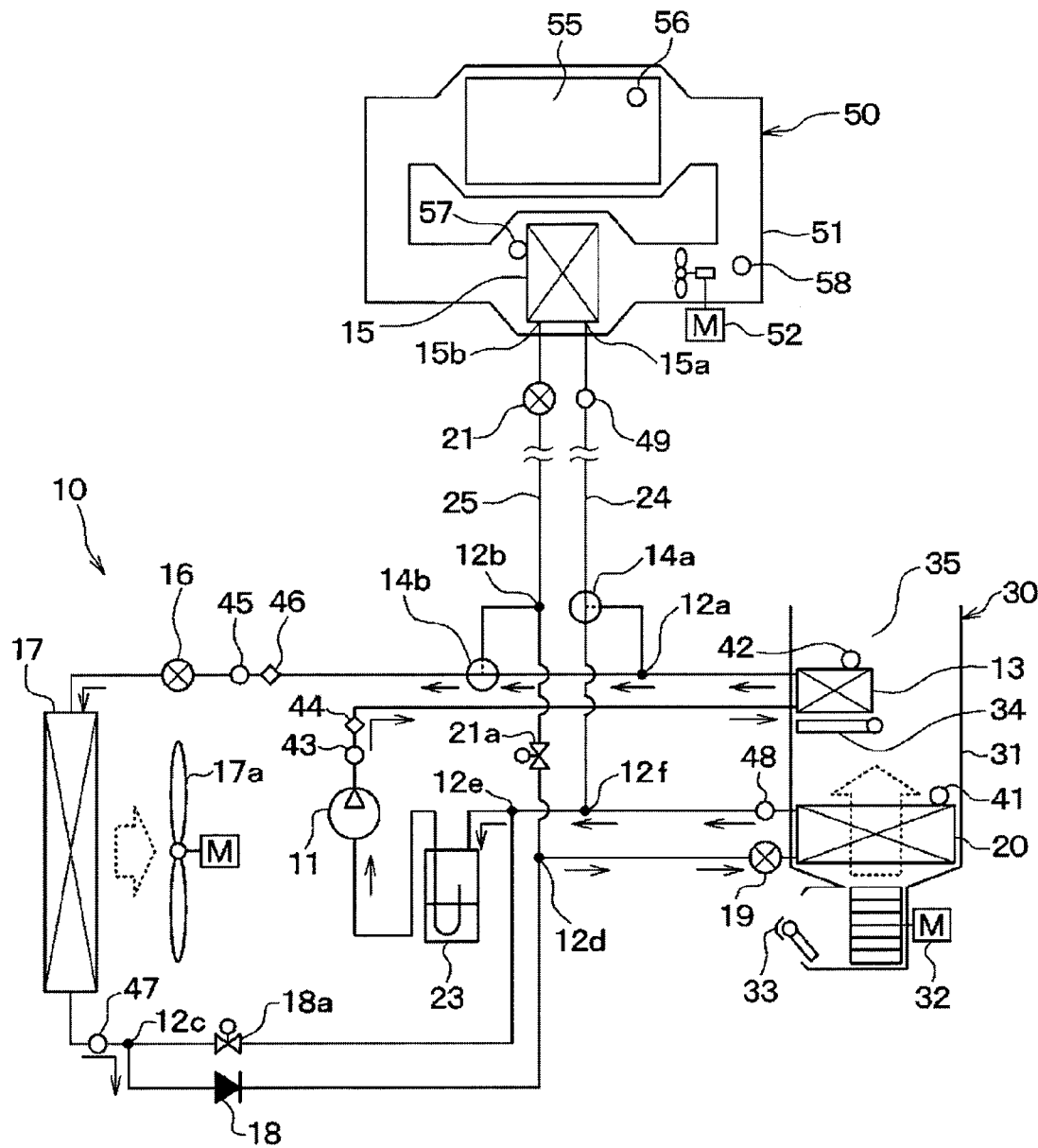
FIG. 2 is a diagram illustrating an overall configuration of a refrigerant flow in a cooling operation mode of the refrigeration cycle device according to the first embodiment.

Consequently, in the cooling operation mode, the refrigeration cycle device 10 can switch over to a refrigerant passage in which the refrigerant flows as indicated by the arrow in FIG. 2.

Furthermore, the controller controls the operations of the compressor 11, the cooling expansion valve 19, the blower 32, and the air mix door 34, similarly to the cooling/battery cooling operation mode. In this case, the controller stops the blower 52 of the battery pack 50, unlike the cooling/battery cooling operation mode. The blower 52 may be operated similarly to the cooling/battery cooling operation mode.

Accordingly, in the refrigeration cycle device 10 of the cooling operation mode, the high-pressure refrigerant discharged from the compressor 11 flows to the interior condenser 13, the heating expansion valve 16 in the fully opened state, and the exterior heat exchanger 17 in this order.

The refrigerant flowing out of the exterior heat exchanger 17 flows into the fourth connection portion 12d through the third connection portion 12c and the check valve 18 and flows to the cooling expansion valve 19. The refrigerant decompressed by the cooling expansion valve 19 flows into the interior evaporator 20 and is evaporated by absorbing heat from the inside air blown by the blower 32. Thereby, the inside air is cooled.

The refrigerant flowing out of the interior evaporator 20 flows into the accumulator 23 through the sixth connection portion 12f and the fifth connection portion 12e. Then, the gas refrigerant separated by the accumulator 23 is introduced into the compressor 11 and compressed again.

As described above, in the cooling operation mode, the inside air can be cooled by the interior evaporator 20 so that the vehicle interior is cooled.

(c) Battery Cooling Operation Mode

The battery cooling operation mode is an operation mode which performs cooling of the secondary battery 55 without performing air conditioning of the vehicle interior. The operation mode is performed when the battery temperature Tb is equal to or greater than the second reference temperature Tk2, in a state in which the operation switch of the operation panel is not closed (OFF).

In the battery cooling operation mode, the controller controls the operation of the first and second three-way valves 14a and 14b, closes the bypass on/off valve 18a, and opens the battery on/off valve 21a, so that the heating expansion valve 16 is in a fully opened state, similarly to the cooling/battery cooling operation mode. In addition, the controller allows the cooling expansion valve 19 to be in a fully closed state, unlike the cooling/battery cooling operation mode.

Figure 3:
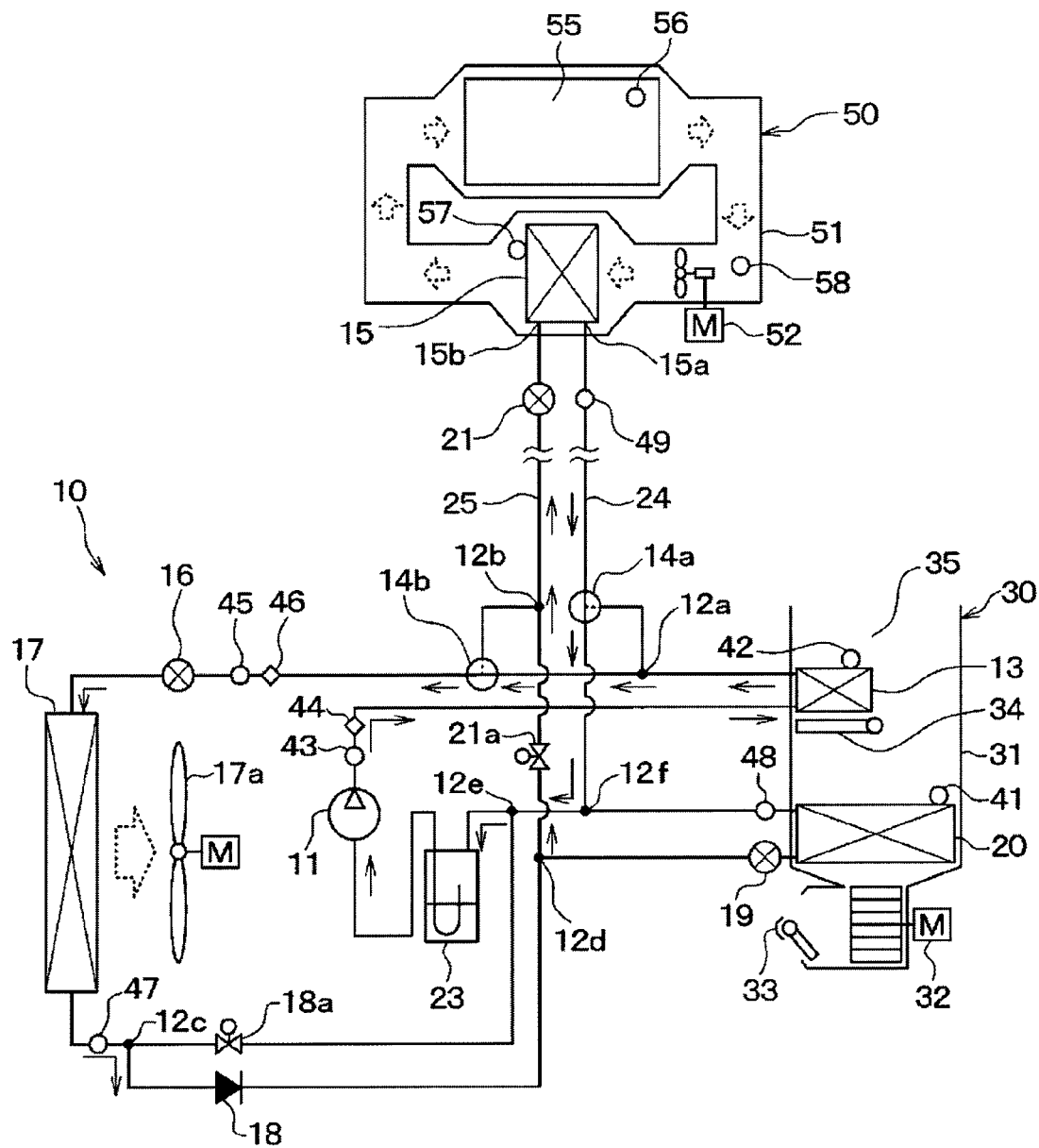
FIG. 3 is a diagram illustrating an overall configuration of a refrigerant flow in a battery cooling operation mode of the refrigeration cycle device according to the first embodiment.

Consequently, in the battery cooling operation mode, the refrigeration cycle device 10 can switch over to a refrigerant passage in which the refrigerant flows as indicated by the arrow in FIG. 3.

Furthermore, the controller controls the operations of the compressor 11, the battery expansion valve 21, the blower 52 of the battery pack 50, and the air mix door 34, similarly to the cooling/battery cooling operation mode. In this case, the controller stops the blower 32 of the interior air conditioning unit 30, unlike the battery cooling and cooling operation mode.

Accordingly, in the refrigeration cycle device 10 of the battery cooling operation mode, the high-pressure refrigerant discharged from the compressor 11 flows to the interior condenser 13, the heating expansion valve 16 in the fully opened state, and the exterior heat exchanger 17 in this order.

The liquid refrigerant flowing out of the exterior heat exchanger 17 flows into the second pipe 25 through the third connection portion 12c, the check valve 18, and the fourth connection portion 12d since the bypass on/off valve 18a and the cooling expansion valve 19 are closed. The liquid refrigerant passing through the second pipe 25 is decompressed until being a low-pressure refrigerant by the battery expansion valve 21. The refrigerant flowing out of the battery expansion valve 21 flows from the second entrance port 15b to the auxiliary heat exchanger 15 and is evaporated by absorbing heat from the battery air blown by the blower 52, so as to be a gas refrigerant. Thereby, the battery air is cooled.

The gas refrigerant flowing out of the first entrance port 15a of the auxiliary heat exchanger 15 passes through the first pipe 24 and flows into the accumulator 23 through the sixth connection portion 12f and the fifth connection portion 12e. Then, the gas refrigerant separated by the accumulator 23 is introduced into the compressor 11 and compressed again.

As described above, in the battery cooling operation mode, the battery air can be cooled by the auxiliary heat exchanger 15 so that the secondary battery 55 is cooled.

In this case, the liquid refrigerant flowing into the auxiliary heat exchanger 15 passes through the second pipe 25 having a small passage cross-sectional area, and the gas refrigerant flowing out of the auxiliary heat exchanger 15 passes through the first pipe 24 having a large passage cross-sectional area.

(d) Heating/Battery Heating Operation Mode

The heating/battery heating operation mode is an operation mode which simultaneously performs heating of the vehicle interior and heating of the secondary battery 55. In more detail, the operation mode is performed when heating is selected by the selection switch and when the battery temperature Tb is equal to or less than the first reference temperature Tk1, in a state in which the operation switch of the operation panel is closed (ON).

In the heating/battery heating operation mode, the controller controls the operation of the first three-way valve 14a so as to connect the first pipe 24 and the first connection portion 12a, controls the operation of the second three-way valve 14b so as to connect the second pipe 25 and the refrigerant inlet of the exterior heat exchanger 17, opens the bypass on/off valve 18a, and closes the battery on/off valve 21a. The controller allows the heating expansion valve 16 to be a throttle state in which decompression action is exhibited, and allows the battery expansion valve 19 to be in a fully opened state by closing the cooling expansion valve 19.

Figure 4:
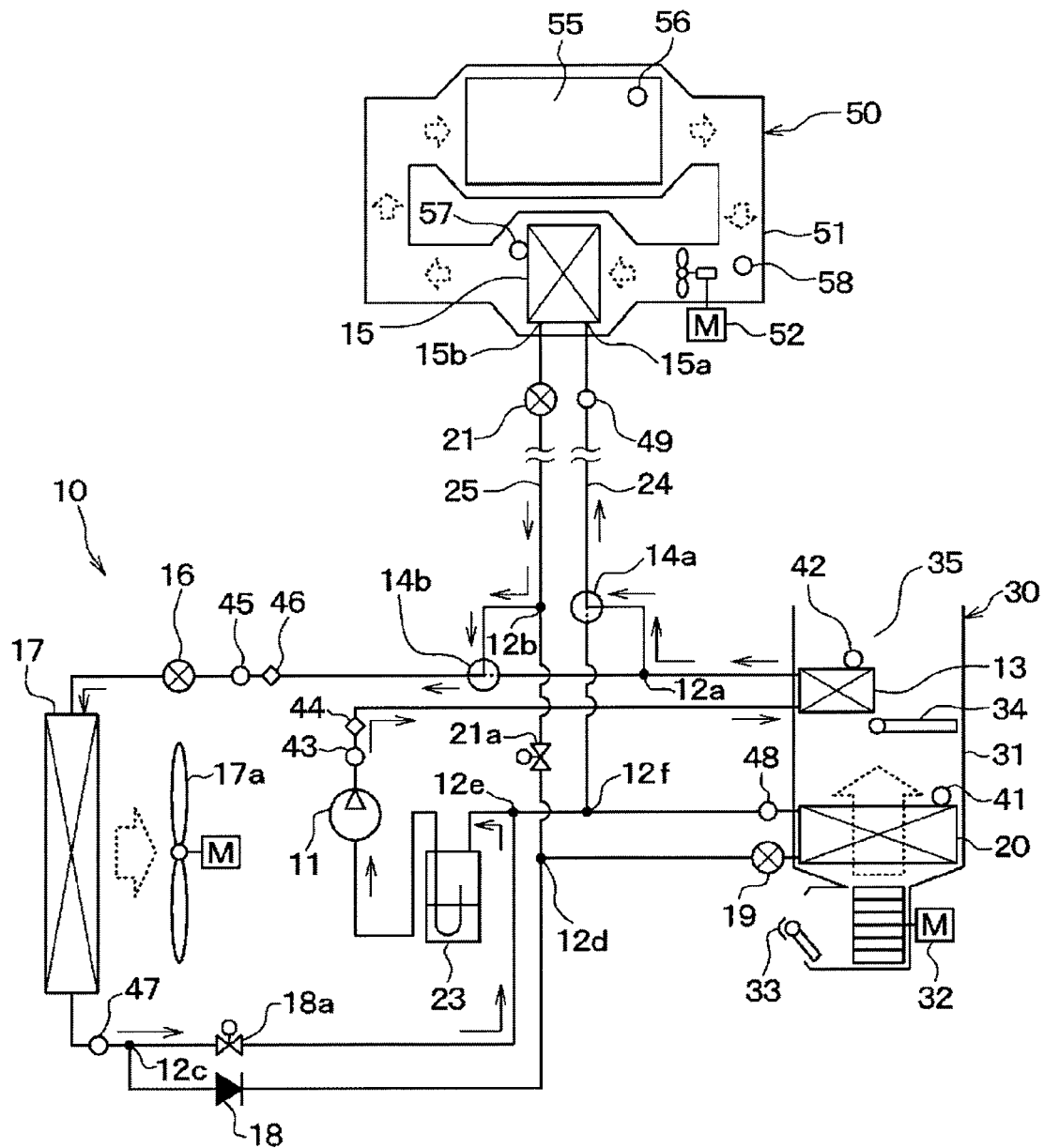
FIG. 4 is a diagram illustrating an overall configuration of a refrigerant flow in a heating/battery heating operation mode of the refrigeration cycle device according to the first embodiment.

Consequently, in the heating/battery heating operation mode, the refrigeration cycle device 10 can switch over to a refrigerant passage in which the refrigerant flows as indicated by the arrow in FIG. 4. In addition, the controller controls the operations of the blower 32 of the interior air conditioning unit 30 and the blower 52 of the battery pack 50, similarly to the cooling/battery cooling operation mode.

The refrigerant discharge capability of the compressor 11 is determined such that blowout air temperature detected by the heating blowout temperature sensor 42 is close to a target blowout temperature TAO. The target blowout temperature TAO when the vehicle interior is heated is about 40° C. to 60° C.

The control signals output to the heating expansion valve 16 are determined such that a degree of supercooling of the refrigerant flowing into the heating expansion valve 16 is close to a target degree of supercooling determined such that a coefficient of performance (COP) of the cycle is determined to be about a maximum value, based on the temperature and pressure states of the refrigerant detected by the second refrigerant temperature sensor 45 and the second refrigerant pressure sensor 46.

The control signals output to the servo motor of the air mix door 34 are determined such that the air mix door 34 fully opens the air passage of the interior condenser 13.

Accordingly, in the refrigeration cycle device 10 of the heating/battery heating operation mode, the high-pressure refrigerant discharged from the compressor 11 flows into the interior condenser 13 and radiates heat by exchanging heat with the inside air. Thereby, the inside air is heated. The refrigerant flowing out of the interior condenser 13 flows from the first entrance port 15a to the auxiliary heat exchanger 15 through the first joint portion 12b, the first three-way valve 14a, and the first pipe 24, and further radiates heat by exchanging heat with the battery air. Thereby, the battery air is heated. The refrigerant flowing out of the second entrance port 15b of the auxiliary heat exchanger 15 passes through the battery expansion valve 21 which is in the fully opened state, and flows into the heating expansion valve 16 through the second connection portion 12b, the second three-way valve 14b to be decompressed. The refrigerant decompressed by the heating expansion valve 16 flows into the exterior heat exchanger 17 and is evaporated by absorbing heat from the outside air blown from the blower fan 17a.

The refrigerant flowing out of the exterior heat exchanger 17 flows into the accumulator 23 through the fifth connection portion 12e since the bypass on/off valve 18a is opened, the cooling expansion valve 19 is closed, and the battery on/off valve 21a is closed. Then, the gas refrigerant separated by the accumulator 23 is introduced into the compressor 11 and compressed again.

As described above, in the heating/battery heating operation mode, the inside air can be heated by the interior condenser 13 so that the vehicle interior is heated and the battery air can be heated by the auxiliary heat exchanger 15 so that the secondary battery 55 is heated.

In this case, the refrigerant flowing into the auxiliary heat exchanger 15 is a two-phase gas-liquid refrigerant, namely, a refrigerant including gas refrigerant, and passes through the first pipe 24 having a large passage cross-sectional area, and the refrigerant flowing out of the auxiliary heat exchanger 15 is a liquid refrigerant and passes through the second pipe 25 having a small passage cross-sectional area.

(e) Heating Operation Mode

The heating operation mode is an operation mode which performs heating of the vehicle interior without performing temperature regulation of the secondary battery 55. The operation mode is performed when heating is selected by the selection switch and when the battery temperature Tb is higher than the first reference temperature Tk1 and is lower than the second reference temperature Tk2, in a state in which the operation switch of the operation panel is closed (ON).

In the heating operation mode, the controller controls the operation of the first and second three-way valves 14a and 14b, similarly to the cooling/battery cooling operation mode. The controller allows the heating expansion valve 16 to be in a throttle state, opens the bypass on/off valve 18a, and closes the cooling expansion valve 19 and the battery on/off valve 21a, similarly to the heating/battery heating operation mode.

Figure 5:
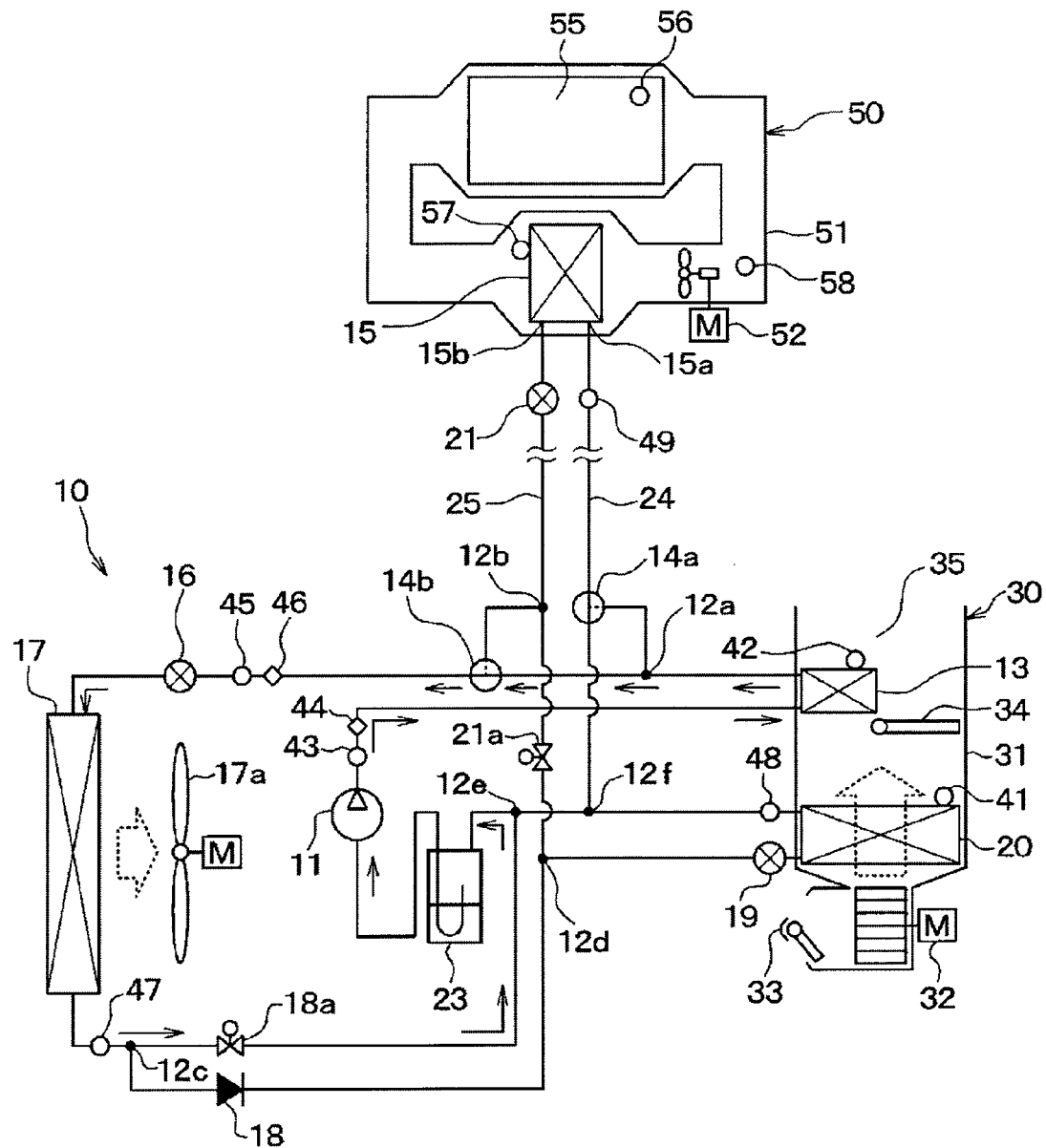
FIG. 5 is a diagram illustrating an overall configuration of a refrigerant flow in a heating operation mode of the refrigeration cycle device according to the first embodiment.

Consequently, in the heating operation mode, the refrigeration cycle device 10 can switch over to a refrigerant passage in which the refrigerant flows as indicated by the arrow in FIG. 5. Furthermore, the controller controls the operations of the compressor 11, the heating expansion valve 16, the blower 32, and the air mix door 34, similarly to the heating/battery heating operation mode. In addition, the controller stops the blower 52 of the battery pack 50, unlike the heating/battery heating operation mode. The blower 52 may be operated similarly to the heating/battery heating operation mode.

Accordingly, in the refrigeration cycle device 10 of the heating operation mode, the high-pressure refrigerant discharged from the compressor 11 flows into the interior condenser 13, radiates heat by exchanging heat with the inside air, and flows out of the interior condenser 13. Thereby, the inside air is heated. The refrigerant flowing out of the interior condenser 13 flows into the heating expansion valve 16 and is decompressed, without being directed toward the auxiliary heat exchanger 15. The subsequent operation is the same as that in the heating/battery heating operation mode.

As described above, in the heating operation mode, the inside air can be cooled by the interior condenser 13 so that the vehicle interior is heated.

(f) Battery Heating Operation Mode

The battery heating operation mode is an operation mode which performs heating of the secondary battery 55 without performing air conditioning of the vehicle interior. The operation mode is performed when the battery temperature Tb is equal to or less than the first reference temperature Tk1, in a state in which the operation switch of the operation panel is not closed (OFF).

In the battery heating operation mode, the controller controls the operation of the first and second three-way valves 14a and 14b, allows the heating expansion valve 16 to be in a throttle state, opens the bypass on/off valve 18a, and closes the cooling expansion valve 19 and the battery on/off valve 21a, similarly to the heating/battery heating operation mode. In addition, the controller allows the cooling expansion valve 19 to be in a fully closed state, unlike the cooling/battery cooling operation mode.

Furthermore, the controller controls the operations of the compressor 11 and the blower 52 of the battery pack 50, similarly to the heating/battery heating operation mode. In addition, the controller stops the blower 32 of the interior air conditioning unit 30, unlike the heating/battery heating operation mode. The control signals output to the servo motor of the air mix door 34 are determined such that the air mix door 34 fully closes the air passage of the interior condenser 13.

Figure 6:
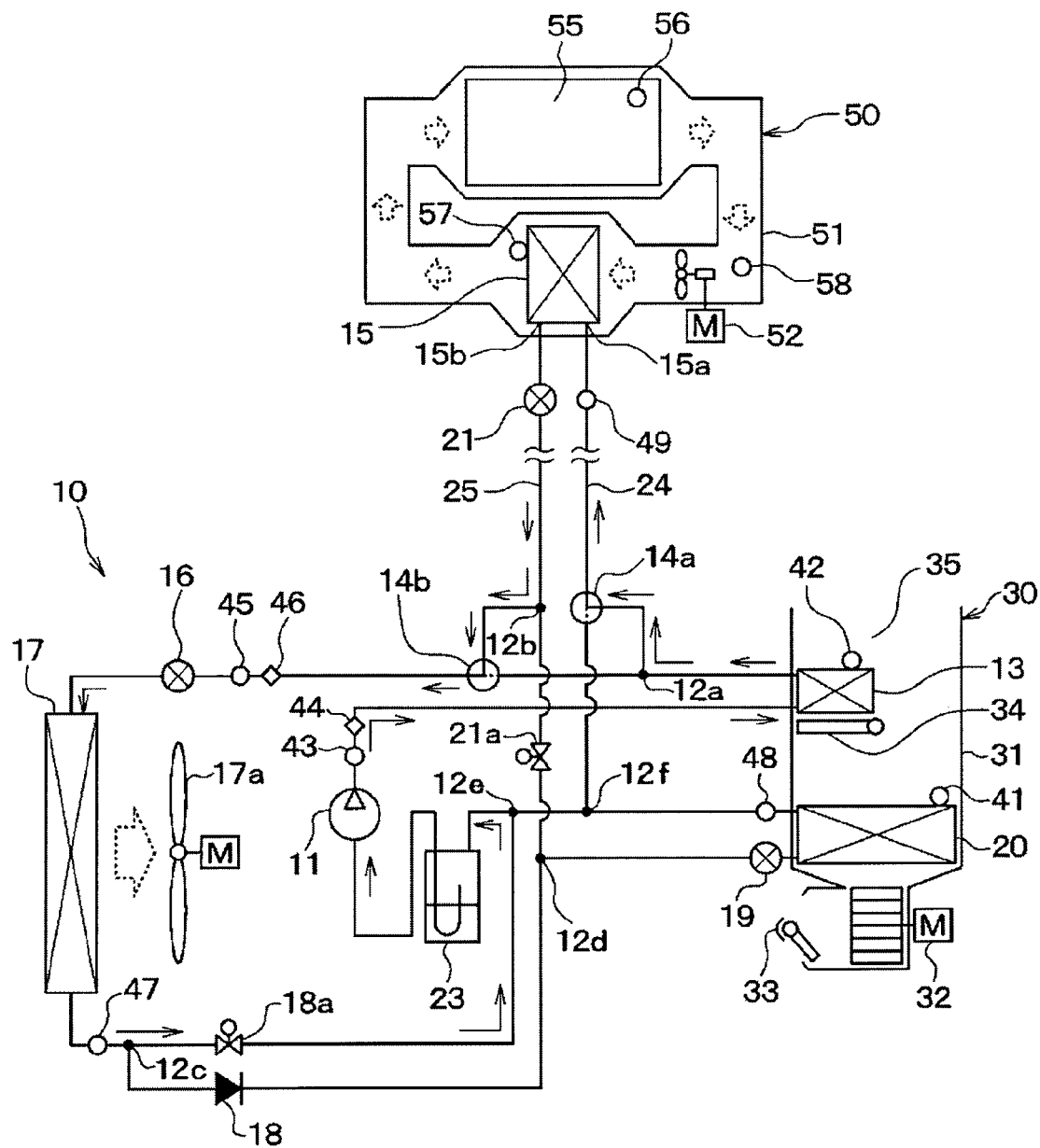
FIG. 6 is a diagram illustrating an overall configuration of a refrigerant flow in a battery heating operation mode of the refrigeration cycle device according to the first embodiment.

Consequently, in the heating operation mode, the refrigeration cycle device 10 can switch over to a refrigerant passage in which the refrigerant flows as indicated by the arrow in FIG. 6, and the refrigerant flows similarly to the heating/battery heating operation mode. Thus, the battery air is heated by exchanging heat between the refrigerant flowing into the auxiliary heat exchanger 15 and the battery air and radiating heat.

In this case, the refrigerant flowing into the auxiliary heat exchanger 15 is a gas refrigerant and passes through the first pipe 24 having a large passage cross-sectional area. The refrigerant flowing out of the auxiliary heat exchanger 15 is a liquid refrigerant and passes through the second pipe 25 having a small passage cross-sectional area.

However, since the operation of the blower 32 is stopped and the air mix door 34 fully closes the air passage of the interior condenser 13, the refrigerant flowing into the interior condenser 13 flows out of the interior condenser 13 without exchange of heat with the inside air. Thus, the inside air is not heated.

As described above, in the battery heating operation mode, the battery air can be heated by the auxiliary heat exchanger 15 so that the secondary battery 55 is heated.

(g) Heating/Battery Cooling Operation Mode

Each of the above-mentioned (a) to (c) operation modes is mainly performed for cooling the vehicle interior or the secondary battery 55 when the temperature of outside air is relatively high in the summer season, and each of the (d) to (f) operation modes is mainly performed for heating the vehicle interior or the secondary battery 55 when the temperature of outside air is relatively low in the winter season.

On the other hand, in the spring or autumn season, the battery temperature Tb may be the second reference temperature Tk2 in such a manner that heating is selected by the selection switch and the secondary battery 55 is self-heated in a state in which the operation switch of the operation panel is closed (ON). In this case, the heating/battery cooling operation mode is performed.

In the heating/battery cooling operation mode, the controller controls the operations of the first and second three-way valves 14a and 14b, allows the heating expansion valve 16 to be in a fully opened state, closes the bypass on/off valve 18a, and opens the battery on/off valve 21a, similarly to the cooling/battery cooling operation mode. In addition, the controller closes the heating expansion valve 19, unlike the cooling/battery cooling operation mode.

Figure 7:
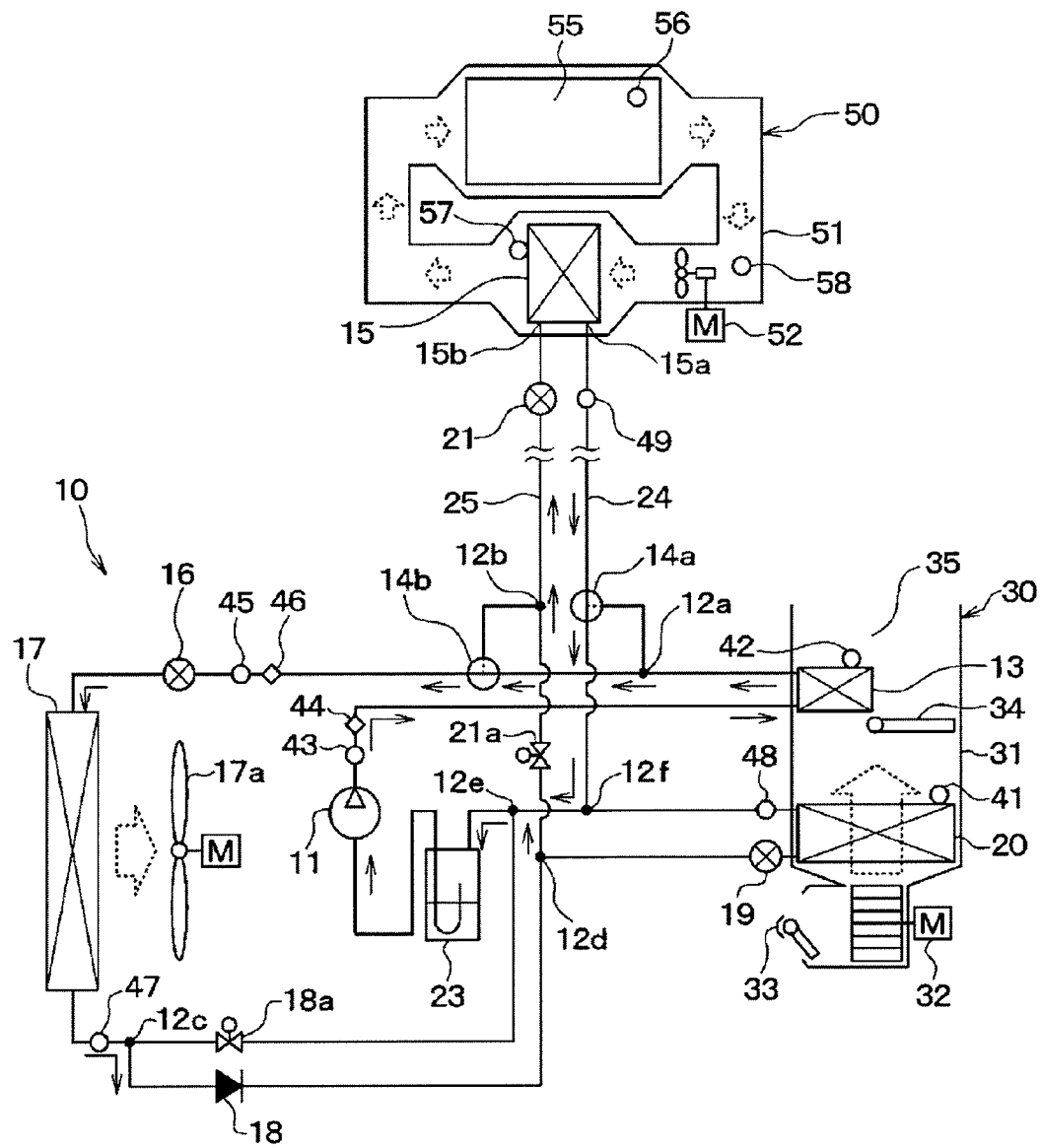
FIG. 7 is a diagram illustrating an overall configuration of a refrigerant flow in a heating/battery cooling operation mode of the refrigeration cycle device according to the first embodiment.

Consequently, in the heating/battery cooling operation mode, the refrigeration cycle device 10 can switch over to a refrigerant passage in which the refrigerant flows as indicated by the arrow in FIG. 7.

Furthermore, the controller controls the operations of the compressor 11, the blower 32 of the interior air conditioning unit 30, and the blower 52 of the battery pack 50, and controls the operation of the air mix door 34, similarly to the heating/battery heating operation mode. The controller controls the operation of the battery expansion valve 21, similarly to the battery cooling operation mode.

Accordingly, in the refrigeration cycle device 10 of the heating/battery cooling operation mode, the high-pressure refrigerant discharged from the compressor 11 flows into the interior condenser 13, radiates heat by exchanging heat with the inside air, and flows out of the interior condenser 13. Thereby, the inside air is heated.

The refrigerant flowing out of the interior condenser 13 flows into the exterior heat exchanger 17 through the heating expansion valve 16 in the fully opened state, without being directed toward the auxiliary heat exchanger 15, and further radiates heat by exchanging heat with the outside air blown from the blower fan 17a, so as to be a liquid refrigerant. The liquid refrigerant flowing out of the exterior heat exchanger 17 flows to the third connection portion 12c, the check valve 18, and the fourth connection portion 12d in this order, and flows into the battery expansion valve 21 through the second pipe 25 to be decompressed, similarly to the battery cooling operation mode. The refrigerant decompressed by the battery expansion valve 21 flows into the auxiliary heat exchanger 15, and is evaporated by absorbing heat from the battery air blown by the blower 52. Thereby, the battery air is cooled. The subsequent operation is the same as that in the battery cooling operation mode.

In this case, the liquid refrigerant flowing into the auxiliary heat exchanger 15 passes through the second pipe 25 having a small passage cross-sectional area, and the gas refrigerant flowing out of the auxiliary heat exchanger 15 passes through the first pipe 24 having a large passage cross-sectional area, similarly to the battery cooling operation mode.

As described above, in the heating/battery cooling operation mode, the inside air can be heated by the interior condenser 13 so that the vehicle interior is heated, and the battery air can be cooled by the auxiliary heat exchanger 15 so that the secondary battery 55 is cooled.

In addition, the refrigeration cycle device 10 may perform a cooling/battery heating operation mode for cooling the vehicle interior and for heating the secondary battery 55, in addition to the above-mentioned (a) to (g) operation modes. Since the cooling of the vehicle interior is performed when the temperature of outside air is relatively high in the summer season, there is no opportunity of the secondary battery 55 being at a temperature which is equal to or less than the first reference temperature Tk1. Thus, there is no opportunity of the cooling/battery heating operation mode being performed.

Next, effects of the first embodiment will be described.

(1) As described in the above (d) heating/battery heating operation mode and (f) battery heating operation mode, in the refrigeration cycle device 10 of the first embodiment, when the battery air is heated, the refrigerant passage switching portion switches over to the first refrigerant passage in which the refrigerant including the gas refrigerant in the range reaching the inlet side of the exterior heat exchanger 17 from the discharge port side of the compressor (specifically, the outlet side of the interior condenser 13) flows into the auxiliary heat exchanger 15 through the first pipe 24 and the liquid refrigerant flowing out of the auxiliary heat exchanger 15 flows to the inlet side of the exterior heat exchanger 17 through the second pipe 25.

Meanwhile, as described in the above (a) cooling/battery cooling operation mode, (c) battery cooling operation mode, and (g) heating/battery cooling operation mode, when the battery is cooled, the refrigerant passage switching portion switches over to the second refrigerant passage in which the liquid refrigerant in the range reaching the suction port side of the compressor 11 (specifically, the inlet side of the interior evaporator 20) from the outlet side of the exterior heat exchanger 17 flows into the auxiliary heat exchanger 15 through the second pipe 25 and the gas refrigerant flowing out of the auxiliary heat exchanger 15 flows to the suction port side of the compressor 11 through the first pipe 24. In addition, the liquid refrigerant passing through the second pipe 25 is decompressed by the battery expansion valve 21 and flows into the auxiliary heat exchanger 15.

Accordingly, even in either of heating and cooling of the battery air, the liquid refrigerant flows through the second pipe having a small passage cross-sectional area and the gas refrigerant flows through the first pipe having a large passage cross-sectional area. Therefore, it may be possible to achieve both of suppression of increase in a refrigerant filling amount and a refrigerant variation amount and suppression of increase in a pressure loss of the refrigerant.

(2) In the refrigeration cycle device 10 of the first embodiment, since the battery air is cooled or heated by one common auxiliary heat exchanger 15, a mounting space of the auxiliary heat exchanger 15 can be reduced in a configuration of cooling or heating battery air using a plurality of heat exchangers. Furthermore, the size of the refrigeration cycle device 10 can be reduced as a whole and the refrigeration cycle device 10 can be manufactured at low cost.

Since the present disclosure has the configuration in which the low-temperature or high-temperature refrigerant flows to one common auxiliary heat exchanger 15, the entire cycle configuration of the refrigeration cycle device can be simplified in a configuration in which a low-temperature or high-temperature refrigerant flows to each of a plurality of heat exchangers. As a result, mounting of the refrigerant cycle device to the product can be improved.

When the same heat exchanger mounting space as that of a configuration in which battery air is cooled or heated using a plurality of heat exchangers is secured, a larger heat exchanger than one auxiliary heat exchanger 15 can be arranged. Therefore, the temperature regulation of the secondary battery 55 can be significantly improved.

(3) In the refrigeration cycle device 10 of the first embodiment, since any temperature regulation target is heated by a heat pump cycle (vapor compression type refrigeration cycle), energy efficiency can be improved when the temperature regulation target is heated by an electric heater or a hot gas cycle.

(4) In the refrigeration cycle device 10 of the first embodiment, when the refrigerant passage switching portion switches over to the first refrigerant passage in the heating/battery heating operation mode, the refrigerant in the range reaching the inlet side of the exterior heat exchanger 17 from the outlet side of the interior condenser 13 flows into the auxiliary heat exchanger 15 and the refrigerant flowing out of the auxiliary heat exchanger 15 flows to the inlet side of the exterior heat exchanger 17. That is, when the refrigerant passage switching portion switches over to the first refrigerant passage, the interior condenser 13 and the auxiliary heat exchanger 15 are connected in series and the auxiliary heat exchanger 15 is arranged downstream of the interior condenser 13 in the refrigerant flow direction.

Accordingly, since the refrigerant having a lower temperature than immediately after that discharged from the compressor 11 by radiating heat using the interior condenser 13 flows to the auxiliary heat exchanger 15, the secondary battery 55 can be heated while the temperature of the secondary battery 55 is suppressed from increasing. This is effective in a case of adopting the secondary battery 55 which is likely to be damaged when the secondary battery 55 is equal to or greater than a predetermined temperature.

(5) In the refrigeration cycle device 10 of the first embodiment, when the refrigerant passage switching portion switches over to the second refrigerant passage as in the cooling/battery cooling operation mode, the battery cooling operation mode, and the heating/battery cooling operation mode, the refrigerant in the range reaching the inlet side of the interior evaporator 20 from the outlet side of the exterior heat exchanger 17 flows into the auxiliary heat exchanger 15 and the refrigerant flowing out of the auxiliary heat exchanger 15 flows to the suction port side of the compressor 11. That is, when the refrigerant passage switching portion switches over to the second refrigerant passage, the interior evaporator 20 and the auxiliary heat exchanger 15 are connected in parallel. Thus, for example, even when the operation mode is switched from the cooling/battery cooling operation mode to the cooling operation mode, dryness of the refrigerant at the inlet side of the interior evaporator 20 can be suppressed from being rapidly changed, compared to series connection between the interior evaporator 20 and the auxiliary heat exchanger 15. Therefore, deterioration of air conditioning feeling can be suppressed.

Second Embodiment

As shown in FIGS. 8 to 12, a second embodiment is to add a four-way valve 26 to the auxiliary heat exchanger 15 in the first embodiment.

In the second embodiment, the auxiliary heat exchanger 15 has a refrigerant inlet 15c through which the refrigerant is introduced and a refrigerant outlet 15d through which the refrigerant is discharged. The auxiliary heat exchanger 15 is configured such that the refrigerant flows in the auxiliary heat exchanger 15 from the refrigerant inlet 15c to the refrigerant outlet 15d.

The refrigerant inlet 15c is connected to a first connection port of the four-way valve 26 through the battery expansion valve 21. The refrigerant outlet 15d is connected to a second connection port of the four-way valve 26. The first and second pipes 24 and 25 are connected to third and fourth connection ports of the four-way valve 26, respectively.

The four-way valve 26 is a communication state switching portion which switches a first communication state in which the refrigerant inlet 15c communicates with the first pipe 24 and the refrigerant outlet 15d communicates with the second pipe 25 and a second communication state in which the refrigerant inlet 15c communicates with the second pipe 25 and the refrigerant outlet 15d communicates with the first pipe 24.

The four-way valve 26 switches the first and second communication states such that the refrigerant inlet side and the refrigerant outlet side of the auxiliary heat exchanger 15 are equal to each other even when either of heating and cooling operation modes of the auxiliary heat exchanger 15 is selected. The operation of the four-way valve 26 is controlled by the control signals output from the controller.

Hereinafter, an operation of each operation mode will be described.

(a) Cooling/Battery Cooling Operation Mode

In the cooling/battery cooling operation mode, the controller controls the operation of the four-way valve 26 such that it is in the second communication state. The operations of the other control target devices are the same as those in the cooling/battery cooling operation mode of the first embodiment.

Figure 8:
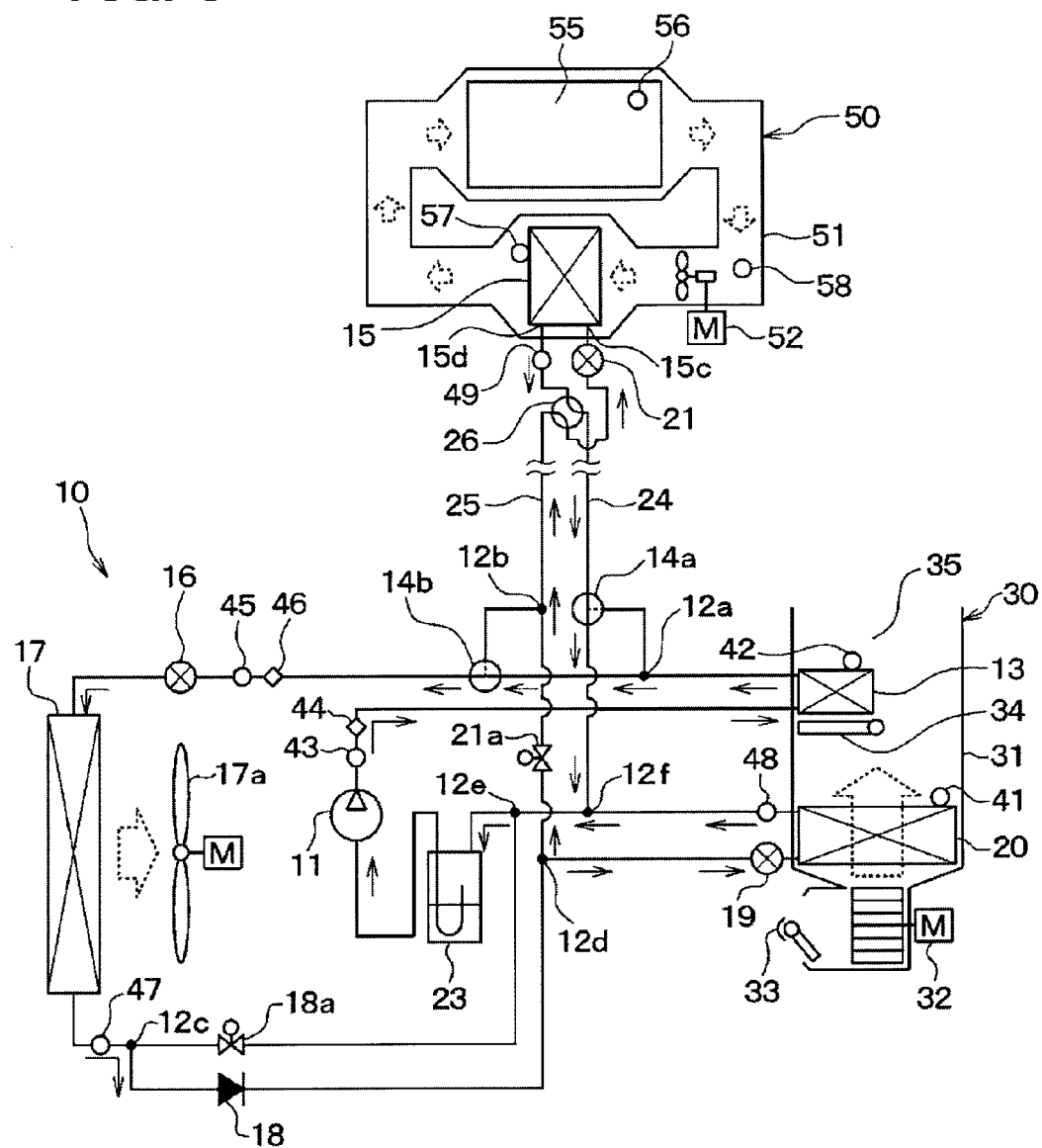
FIG. 8 is a diagram illustrating an overall configuration of a refrigerant flow in a cooling/battery cooling operation mode of a refrigeration cycle device according to a second embodiment.

Consequently, in the cooling/battery cooling operation mode, the refrigeration cycle device 10 can switch over to a refrigerant passage in which the refrigerant flows as indicated by the arrow in FIG. 8. In this case, the refrigerant flow and the operation of each device are the same as those in the cooling/battery cooling operation mode of the first embodiment, except for the refrigerant flow direction in the auxiliary heat exchanger 15.

In the second embodiment, as shown in FIG. 8, the refrigerant passing through the second pipe 25 flows to the refrigerant inlet 15c of the auxiliary heat exchanger 15 through the four-way valve 26. In this case, the refrigerant decompressed by the battery expansion valve 21 flows from the refrigerant inlet 15c to the auxiliary heat exchanger 15, flows toward the refrigerant outlet 15d in the auxiliary heat exchanger 15, and is evaporated by absorbing heat from the battery air blown by the blower 52, so as to be a gas refrigerant. The gas refrigerant flowing out of the refrigerant outlet 15d of the auxiliary heat exchanger 15 flows into the first pipe 24 through the four-way valve 26.

(b) Cooling Operation Mode

In the cooling operation mode, the operations of the control target devices are the same as those in the cooling operation mode of the first embodiment. For this reason, the refrigerant flow and the operation of each device in the refrigeration cycle device 10 are the same as those in the cooling operation mode of the first embodiment.

(c) Battery Cooling Operation Mode

In the battery cooling operation mode, the controller controls the operation of the four-way valve 26 such that it is in the second communication state, similarly to the cooling/battery cooling operation mode. The operations of the other control target devices are the same as those in the battery cooling operation mode of the first embodiment.

Figure 9:
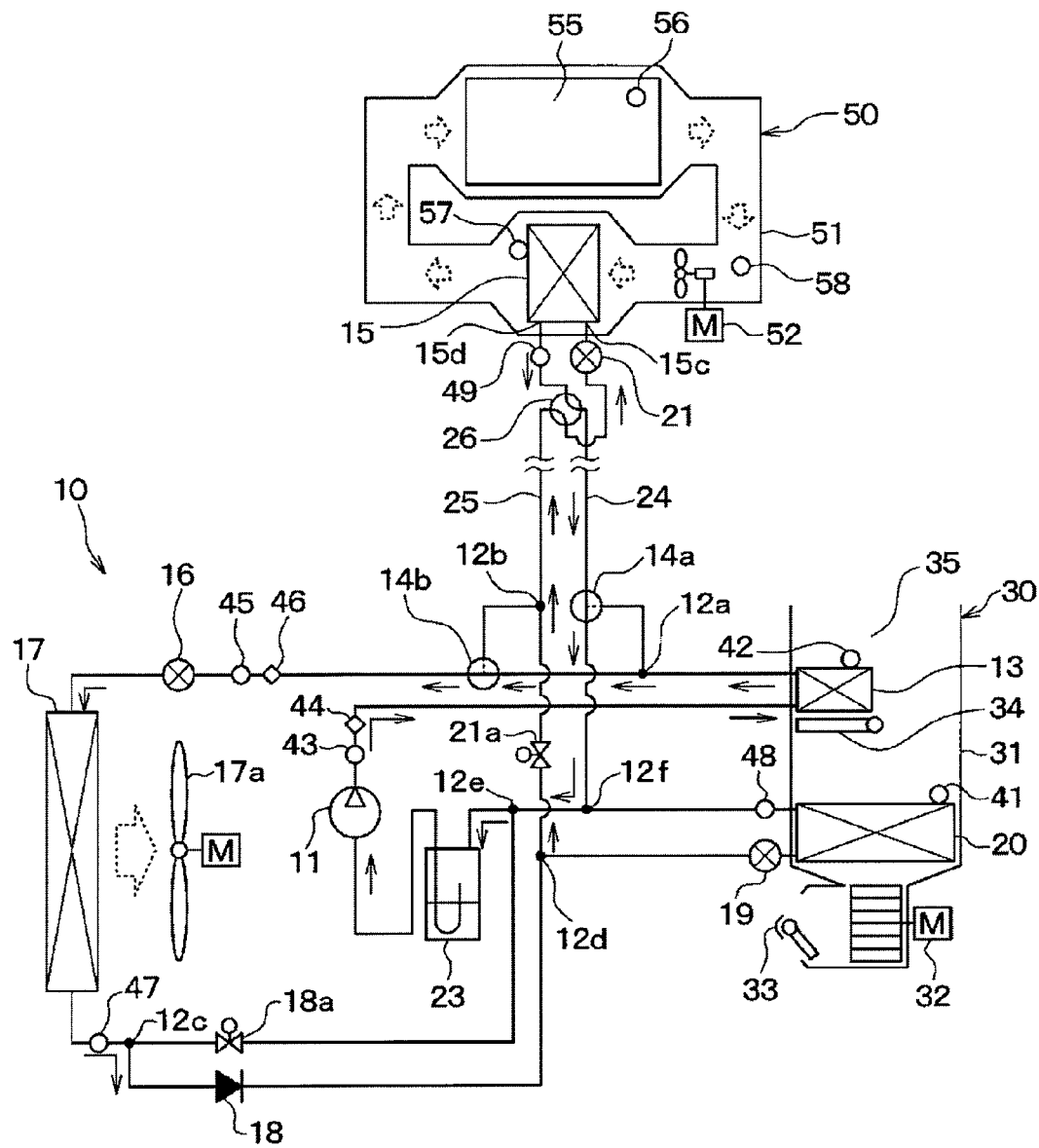
FIG. 9 is a diagram illustrating an overall configuration of a refrigerant flow in a battery cooling operation mode of the refrigeration cycle device according to the second embodiment.

Consequently, in the battery cooling operation mode, the refrigeration cycle device 10 can switch over to a refrigerant passage in which the refrigerant flows as indicated by the arrow in FIG. 9. In this case, the refrigerant flow and the operation of each device are the same as those in the battery cooling operation mode of the first embodiment, except for the refrigerant flow direction in the auxiliary heat exchanger 15.

As shown in FIG. 9, the refrigerant passing through the second pipe 25 flows to the refrigerant inlet 15c of the auxiliary heat exchanger 15 through the four-way valve 26, similarly to the cooling/battery cooling operation mode. In addition, the gas refrigerant flowing out of the refrigerant outlet 15d of the auxiliary heat exchanger 15 flows into the first pipe 24 through the four-way valve 26.

(d) Heating/Battery Heating Operation Mode

In the heating/battery heating operation mode, the controller controls the operation of the four-way valve 26 such that it is in the first communication state, and allows the battery expansion valve 21 to be in a throttle state instead of a fully opened state, so that the battery expansion valve 21 acts as an intermediate throttle.

The control signals output to the battery expansion valve 21 are provided such that the refrigerant pressure in the auxiliary heat exchanger 15 is a pressure in which the battery temperature Tb is in a proper temperature range (10° C. to 40° C. in the second embodiment), based on the pressure of the refrigerant detected by the second refrigerant pressure sensor 46, thereby allowing an opening degree of the battery expansion valve 21 to be determined. The operations of the other control target devices are the same as those in the heating/battery heating operation mode of the first embodiment.

In addition, since the refrigerant discharge capability of the compressor 11 is determined such that the blowout air temperature of the interior condenser 13 is close to a target blowout temperature TAO, the refrigerant pressure in the interior condenser 13 is regulated to a pressure in which the vehicle interior can be heated (that is, a pressure in which the inside air can be heated to about 40° C. to 60° C.).

Figure 10:
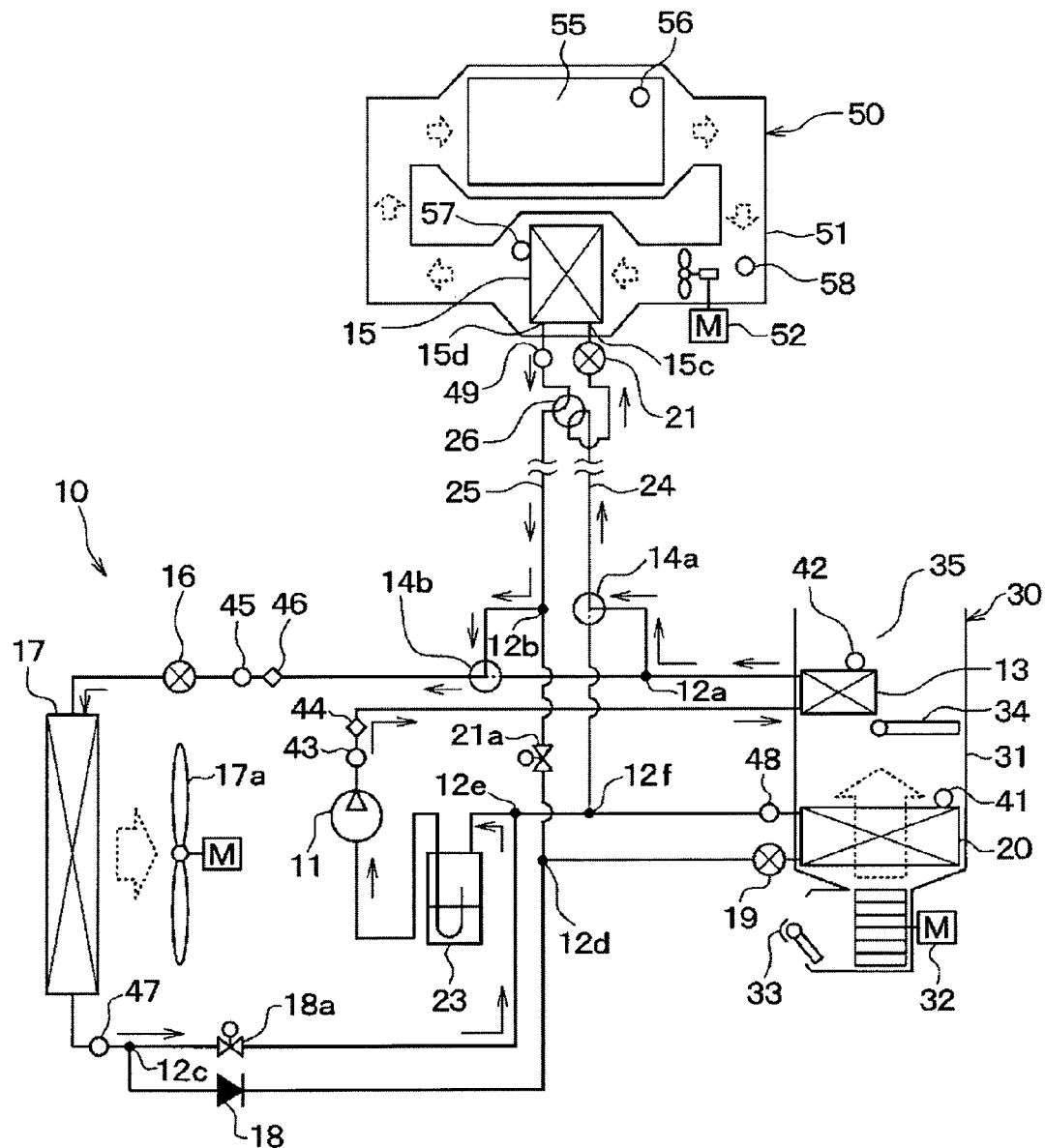
FIG. 10 is a diagram illustrating an overall configuration of a refrigerant flow in a heating/battery heating operation mode of the refrigeration cycle device according to the second embodiment.

Consequently, in the heating/battery heating operation mode, the refrigeration cycle device 10 can switch over to a refrigerant passage in which the refrigerant flows as indicated by the arrow in FIG. 10. In this case, the refrigerant flow and the operation of each device are the same as those in the heating/battery heating operation mode of the first embodiment, except for the following points.

In the second embodiment, as shown in FIG. 10, the refrigerant passing through the first pipe 24 flows into the battery expansion valve 21 and is decompressed until being an intermediate pressure. The refrigerant decompressed by the battery expansion valve 21 flows from the refrigerant inlet 15c to the auxiliary heat exchanger 15, flows toward the refrigerant outlet 15d in the auxiliary heat exchanger 15, and is condensed by radiating heat to the battery air blown by the blower 52, so as to be a liquid refrigerant. The liquid refrigerant flowing out of the refrigerant outlet 15d of the auxiliary heat exchanger 15 flows into the second pipe 25 through the four-way valve 26.

(e) Heating Operation Mode

In the heating operation mode, the operations of the control target devices are the same as those in the heating operation mode of the first embodiment. For this reason, the refrigerant flow and the operation of each device in the refrigeration cycle device 10 are the same as those in the heating operation mode of the first embodiment.

(f) Battery Heating Operation Mode

In the battery heating operation mode, the controller controls the operation of the four-way valve 26 such that it is in the second communication state, similarly to the heating/battery heating operation mode. However, the controller allows the battery expansion valve 21 to be in a fully opened state, unlike the heating/battery heating operation mode. The operations of the other control target devices are the same as those in the battery heating operation mode of the first embodiment.

Figure 11:
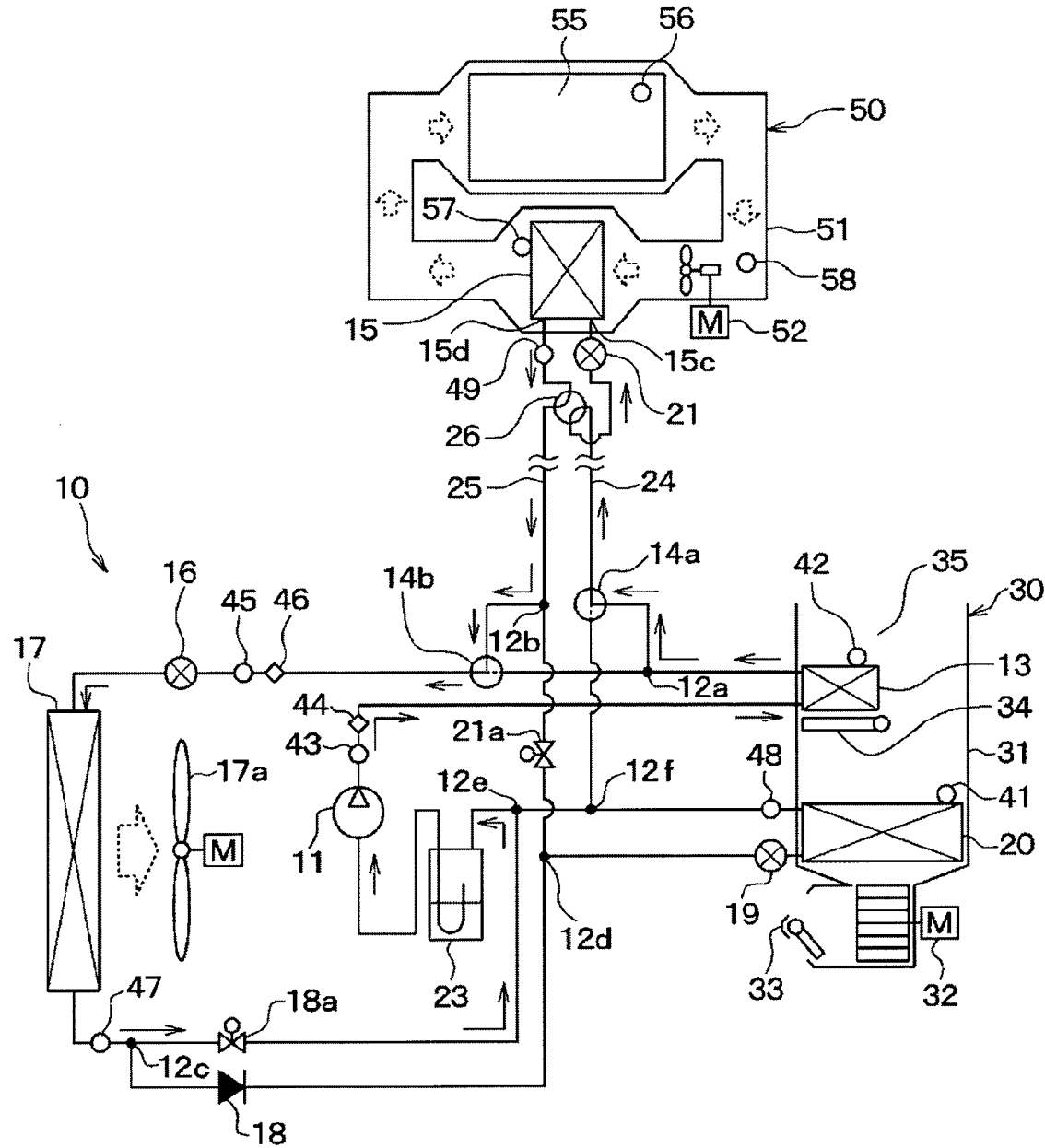
FIG. 11 is a diagram illustrating an overall configuration of a refrigerant flow in a battery heating operation mode of the refrigeration cycle device according to the second embodiment.

Consequently, in the battery heating operation mode, the refrigeration cycle device 10 can switch over to a refrigerant passage in which the refrigerant flows as indicated by the arrow in FIG. 11. In this case, the refrigerant flow and the operation of each device are the same as those in the battery heating operation mode of the first embodiment.

In addition, as shown in FIG. 11, the refrigerant passing through the first pipe 24 flows to the refrigerant inlet 15c of the auxiliary heat exchanger 15 through the four-way valve 26, similarly to the heating/battery heating operation mode. In addition, the liquid refrigerant flowing out of the refrigerant outlet 15d of the auxiliary heat exchanger 15 flows into the second pipe 25 through the four-way valve 26.

(g) Heating/Battery Cooling Operation Mode

In the heating/battery cooling operation mode, the controller controls the operation of the four-way valve 26 such that it is in the second communication state. The operations of the other control target devices are the same as those in the heating/battery cooling operation mode of the first embodiment.

Figure 12:
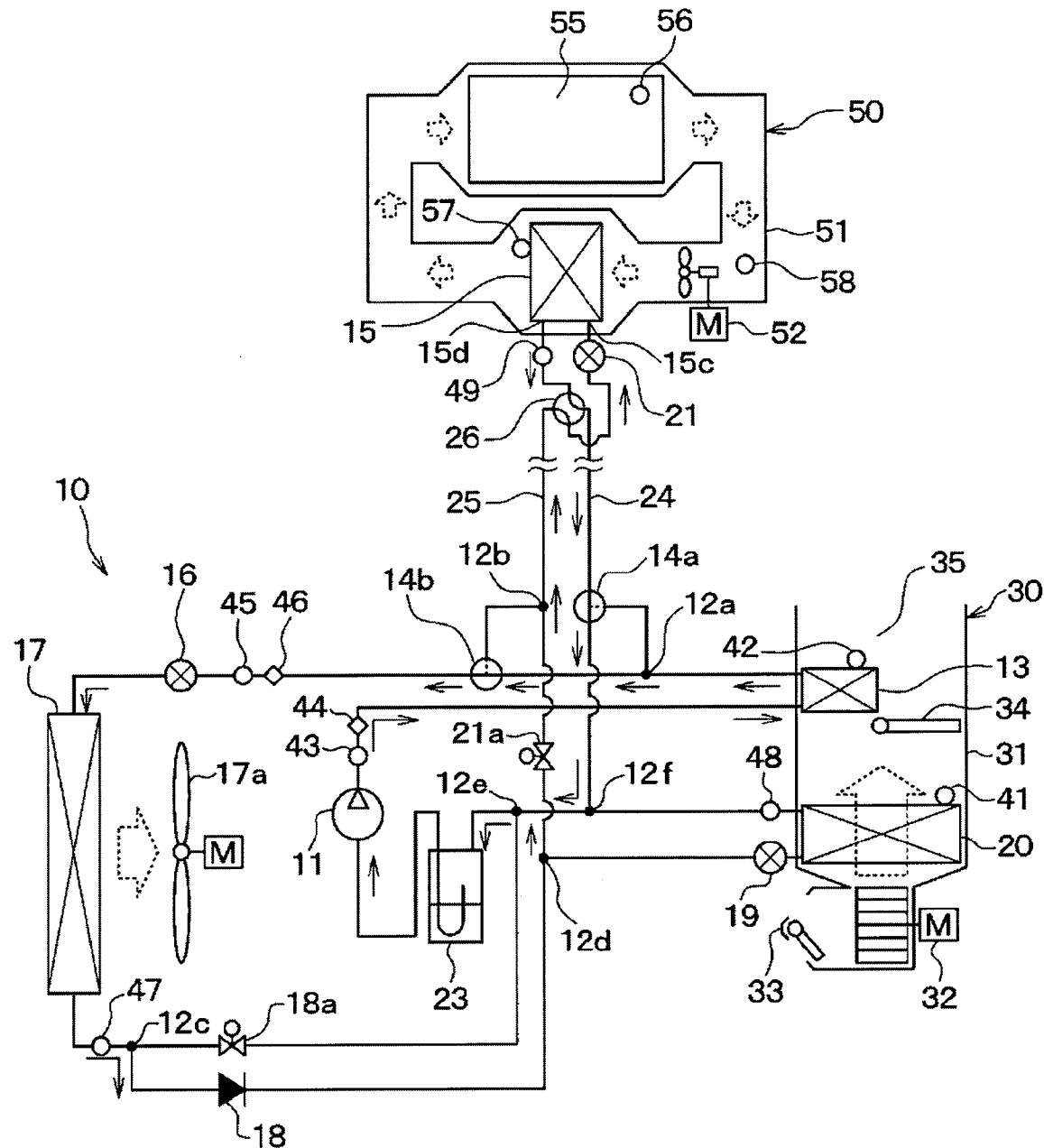
FIG. 12 is a diagram illustrating an overall configuration of a refrigerant flow in a heating/battery cooling operation mode of the refrigeration cycle device according to the second embodiment.

Consequently, in the heating/battery cooling operation mode, the refrigeration cycle device 10 can switch over to a refrigerant passage in which the refrigerant flows as indicated by the arrow in FIG. 12. In this case, the refrigerant flow and the operation of each device are the same as those in the heating/battery cooling operation mode of the first embodiment, except for the refrigerant flow direction in the auxiliary heat exchanger 15.

As shown in FIG. 12, the refrigerant passing through the second pipe 25 flows to the refrigerant inlet 15c of the auxiliary heat exchanger 15 through the four-way valve 26. In this case, the refrigerant decompressed by the battery expansion valve 21 flows from the refrigerant inlet 15c to the auxiliary heat exchanger 15, flows toward the refrigerant outlet 15d in the auxiliary heat exchanger 15, and is evaporated by absorbing heat from the battery air blown by the blower 52, so as to be a gas refrigerant. The gas refrigerant flowing out of the refrigerant outlet 15d of the auxiliary heat exchanger 15 flows into the first pipe 24 through the four-way valve 26.

The refrigeration cycle device 10 of the second embodiment has the following effects in addition to the effects (1) to (5) described in the first embodiment.

Even when the refrigerant passage switching portion switches the first refrigerant passage (see FIGS. 10 and 11) and the second refrigerant passage (see FIGS. 8, 9, and 12), the refrigerant inlet side and the refrigerant outlet side in the auxiliary heat exchanger 15 are not changed in such a manner that the four-way valve 26 switches the first and second communication states.

In other words, the four-way valve 26 switches the first and second communication states such that the refrigerant flow direction in the auxiliary heat exchanger 15 when the refrigerant passage switching portion switches over to the first refrigerant passage is equal to the refrigerant flow direction in the auxiliary heat exchanger 15 when the refrigerant passage switching portion switches over to the second refrigerant passage. Thus, the auxiliary heat exchanger 15 can have an easily optimized specification.

During heating in addition to cooling, the battery expansion valve 21 is arranged upstream of the refrigerant inlet 15c of the auxiliary heat exchanger 15 in the refrigerant flow direction by the operation of the four-way valve 26. Therefore, in the "heating/battery heating operation mode", the battery expansion valve 26 can act as an intermediate throttle for allowing the refrigerant flowing into the auxiliary heat exchanger 15 to be decompressed and have an intermediate pressure. In addition, the intermediate pressure means a pressure between the pressure (high pressure) of the refrigerant after being discharged from the compressor 11 and the pressure (low pressure) of the refrigerant introduced into the compressor 11.

Hereinafter, an operation effect of the intermediate throttle will be described. In general, the temperature of inside air required for heating is about 40° C. to 60° C., the optimal battery temperature required for output of the secondary battery 55 (for instance, lithium-ion battery) is about 10° C. to 40° C., and the battery temperature required for heating of the secondary battery 55 in the winter season is about 20° C. to 40° C. That is, the temperature of inside air required for heating is higher than the battery temperature required for heating of the secondary battery 55.

Here, when the auxiliary heat exchanger 15 is arranged in series downstream of the interior condenser 13 in the refrigerant flow direction and the intermediate throttle is not arranged between the interior condenser 13 and the auxiliary heat exchanger 15, heat is significantly radiated when the refrigeration cycle device is operated in the heating/battery heating operation mode. For this reason, the pressure of the high-pressure refrigerant is lowered and the ventilation temperature required for heating is lowered, compared to the heating operation mode in which the interior condenser 13 acts as a radiator independently.

Figure 13:
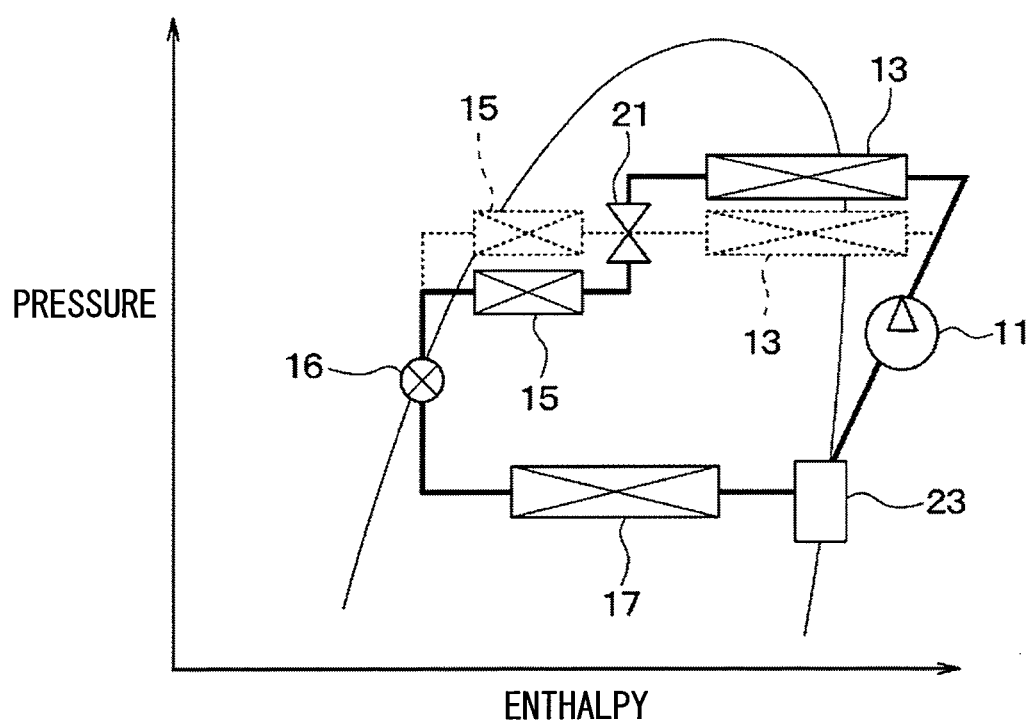
FIG. 13 is a Mollier diagram illustrating a refrigerant state in the heating/battery heating operation mode of the refrigeration cycle device according to the second embodiment.

On the other hand, according to the second embodiment, the battery expansion valve 21 acts as the intermediate throttle in the heating/battery heating operation mode. Therefore, as shown in the Mollier diagram of FIG. 13, the pressure of the refrigerant flowing in the interior condenser 13 can be increased compared to a case in which the intermediate throttle is not arranged. In addition, in the Mollier diagram of FIG. 13, the case in which the intermediate throttle is not arranged is indicated by the broken line and the second embodiment is indicated by the solid line.

Accordingly, according to the second embodiment, the temperature of the inside air heated by the interior condenser 13 can be increased compared to the case in which the intermediate throttle is not arranged.

In short, according to the second embodiment, the interior condenser (the radiating heat exchanger) 13 which radiates heat by exchanging heat between the refrigerant discharged from the compressor 11 and the inside air (first temperature regulation target) and discharges the refrigerant to the inlet of the exterior heat exchanger 17 is provided as a utilization-side heat exchanger.

When it is switched into the first refrigerant passage, the refrigerant in the range reaching the inlet side of the exterior heat exchanger 17 from the outlet side of the interior condenser 13 flows into the auxiliary heat exchanger 15 through the first pipe 24 and the refrigerant flowing out of the auxiliary heat exchanger 15 flows to the inlet side of the exterior heat exchanger 17 through the second pipe 25.

The auxiliary heat exchanger 15 has the refrigerant inlet 15c through which the refrigerant is introduced and the refrigerant outlet 15d through which the refrigerant is discharged.

The refrigerant passage switching portion has the four-way valve (communication state switching portion) 26 which switches the first communication state in which the refrigerant inlet 15c of the auxiliary heat exchanger 15 communicates with the first pipe 24 and the refrigerant outlet 15d of the auxiliary heat exchanger 15 communicates with the second pipe 25 and the second communication state in which the refrigerant inlet 15c of the auxiliary heat exchanger 15 communicates with the second pipe 25 and the refrigerant outlet 15d of the auxiliary heat exchanger 15 communicates with the first pipe 24.

The four-way valve 26 allows the first communication state when it is switched into the first refrigerant passage and allows the second communication state when it is switched into the second refrigerant passage.

In addition, the refrigeration cycle device 10 of the second embodiment has the battery expansion valve (pressure reducer) 21 which is disposed between the refrigerant inlet 15c of the auxiliary heat exchanger 15 and the four-way valve 26 to decompress the refrigerant flowing into the refrigerant inlet 15c of the auxiliary heat exchanger 15.

Consequently, the refrigerant inlet 15c and the refrigerant outlet 15d of the auxiliary heat exchanger 15 are equal to each other when the refrigerant passage switching portion switches the first and second refrigerant passages. For this reason, since the refrigerant flow direction in the auxiliary heat exchanger 15 is constant even when it is switched to either of the first and second refrigerant passages, the auxiliary heat exchanger 15 can have an easily optimized specification.

In addition, even when it is switched to either of the first and second refrigerant passages, the refrigerant flowing into the refrigerant inlet 15c of the auxiliary heat exchanger 15 can be decompressed by one common battery expansion valve (pressure reducer) 21. For this reason, the battery expansion valve 21 can act as an intermediate throttle for allowing the refrigerant flowing into the auxiliary heat exchanger 15 to be decompressed and have an intermediate pressure when it is switched into the first refrigerant passage. As a result, when it is switched into the first refrigerant passage, the temperature of the inside air heated by the interior condenser 13 can be increased compared to a case in which the intermediate throttle for decompressing the refrigerant flowing into the refrigerant inlet 15c of the auxiliary heat exchanger 15 is not arranged.

Third Embodiment

Figure 14:
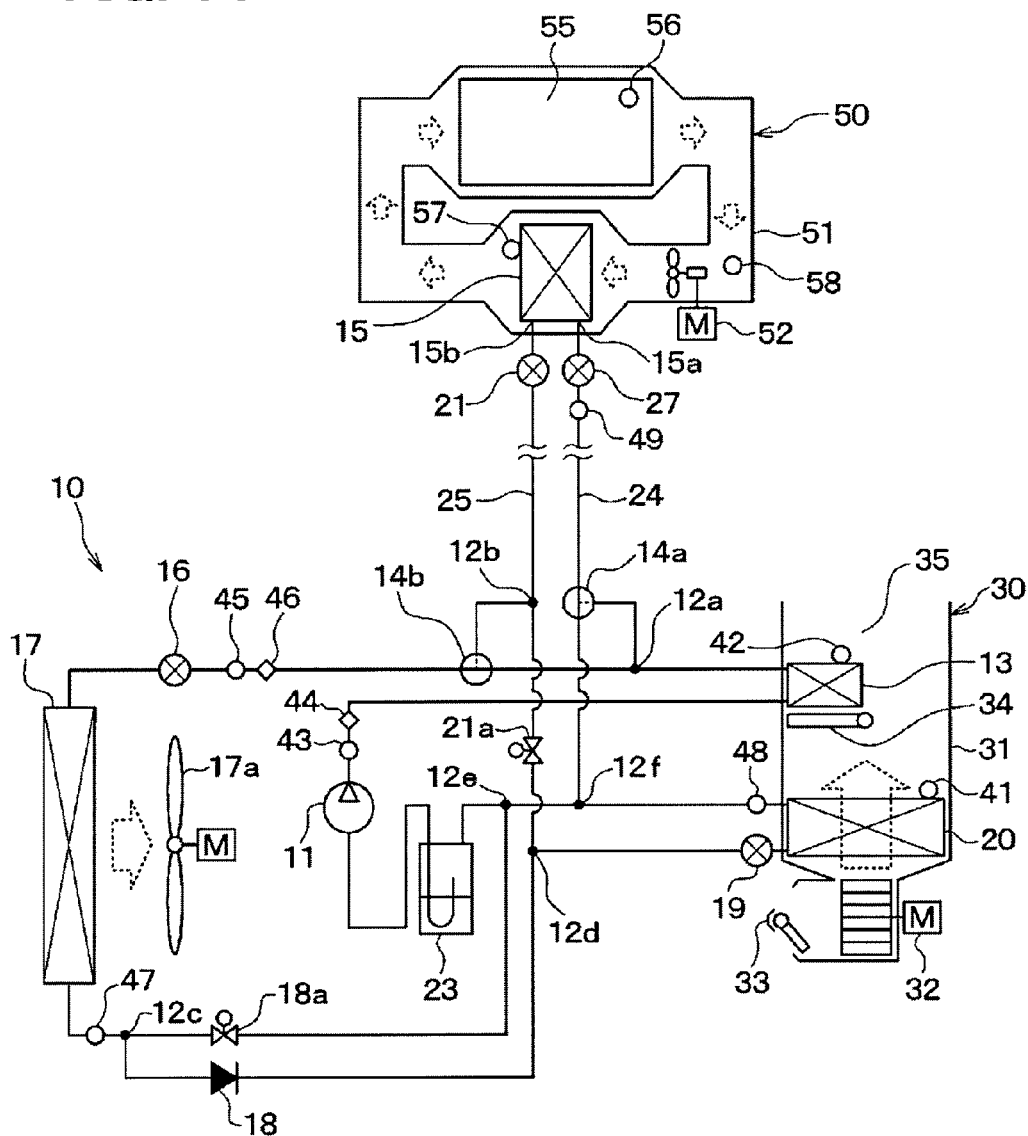
FIG. 14 is a diagram illustrating an overall configuration of a refrigeration cycle device according to a third embodiment.

As shown in FIG. 14, a third embodiment is to add a first battery expansion valve (first pressure reducer) 27 in the refrigeration cycle device 10 of the first embodiment. A second battery expansion valve (second pressure reducer) 21 corresponds to the battery expansion valve 21 of the first embodiment.

The auxiliary heat exchanger 15 communicates with the first pipe 24 through the first battery expansion valve 27 at the first entrance port 15a, and communicates with the second pipe 25 through the second battery expansion valve 21 at the second entrance port 15b.

Each of the first and second battery expansion valves 27 and 21 is an electric expansion valve having the same configuration as the heating expansion valve 16, and has a full closing function and a full opening function.

In each operation mode, the operations of the first and second battery expansion valves 27 and 21 are as follows, and the operations of the other devices are the same as those in each operation mode of the first embodiment.

In the cooling/battery cooling operation mode, the battery cooling operation mode, and the heating/battery cooling operation mode, the second battery expansion valve 21 is in a throttle state and the first battery expansion valve 27 is in a fully opened state.

In the cooling operation mode and the heating operation mode, the second battery expansion valve 21 is in a fully closed state and the first battery expansion valve 27 is in a fully closed state.

In the battery heating operation mode, the second battery expansion valve 21 is in a fully opened state and the first battery expansion valve 27 is in a fully opened state.

In the heating/battery heating operation mode, the second battery expansion valve 21 is in a fully opened state and the first battery expansion valve 27 is in a throttle state.

Here, the second embodiment is to add the four-way valve 26 in the configuration of the refrigeration cycle device 10 of the first embodiment. In the second embodiment, the battery expansion valve 21 which acts as a cooling throttle in the battery cooling operation mode acts as an intermediate throttle in the heating/battery heating operation mode.

The third embodiment is to add the first battery expansion valve 27 in the configuration of the refrigeration cycle device 10 of the first embodiment. Thereby, the above intermediate throttle action can be realized. Thus, the intermediate throttle can be formed through a low cost and a simple configuration, compared to a case of using the four-way valve.

In short, the refrigeration cycle device 10 of the third embodiment includes the first battery expansion valve (first pressure reducer) 27 which is arranged between the auxiliary heat exchanger 15 and the first pipe 24 to decompress the refrigerant flowing into the auxiliary heat exchanger 15, and the second battery expansion valve (second pressure reducer) 21 which is arranged between the auxiliary heat exchanger 15 and the second pipe 25 to decompress the refrigerant flowing into the auxiliary heat exchanger 15.

Consequently, when it is switched into the first refrigerant passage, the first battery expansion valve 27 can acts as the above-mentioned intermediate throttle. As a result, when it is switched into the first refrigerant passage, the temperature of the inside air heated by the interior condenser (radiating heat exchanger) 13 can be increased compared to a case in which the intermediate throttle for decompressing the refrigerant flowing into the refrigerant inlet 15c of the auxiliary heat exchanger 15 is not arranged.

Fourth Embodiment

In the first embodiment, the refrigeration cycle device 10 is configured such that the interior evaporator 20 and the auxiliary heat exchanger 15 are connected in parallel when the refrigerant passage switching portion switches over to the second refrigerant passage as in the cooling/battery cooling operation mode, the battery cooling operation mode, and the heating/battery cooling operation mode. On the other hand, in a fourth embodiment, the refrigeration cycle device 10 is configured such that the interior evaporator 20 and the auxiliary heat exchanger 15 are connected in series.

Figure 15:
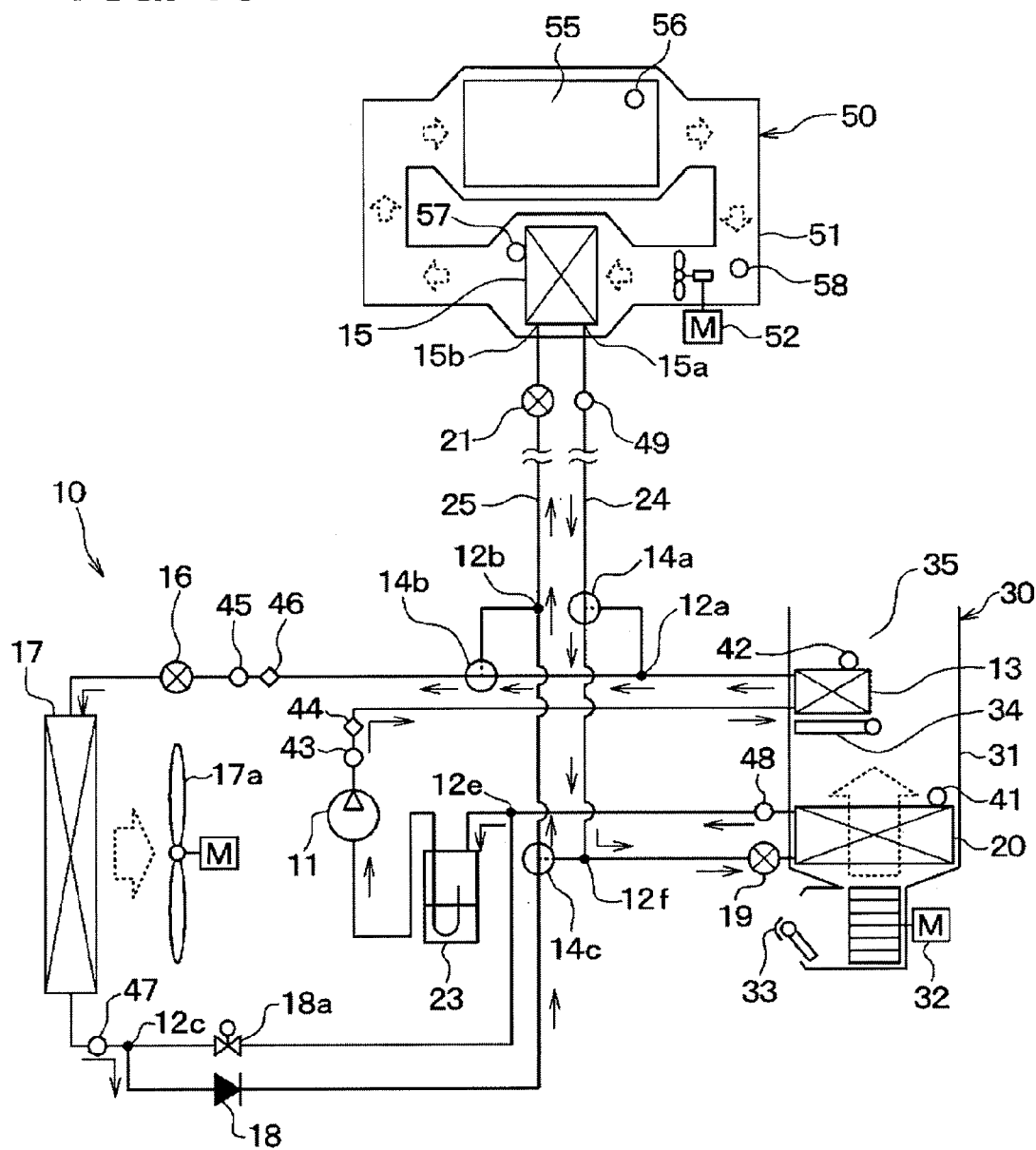
FIG. 15 is a diagram illustrating an overall configuration of a refrigerant flow in a cooling/battery cooling operation mode of a refrigeration cycle device according to a fourth embodiment.
Figure 16:
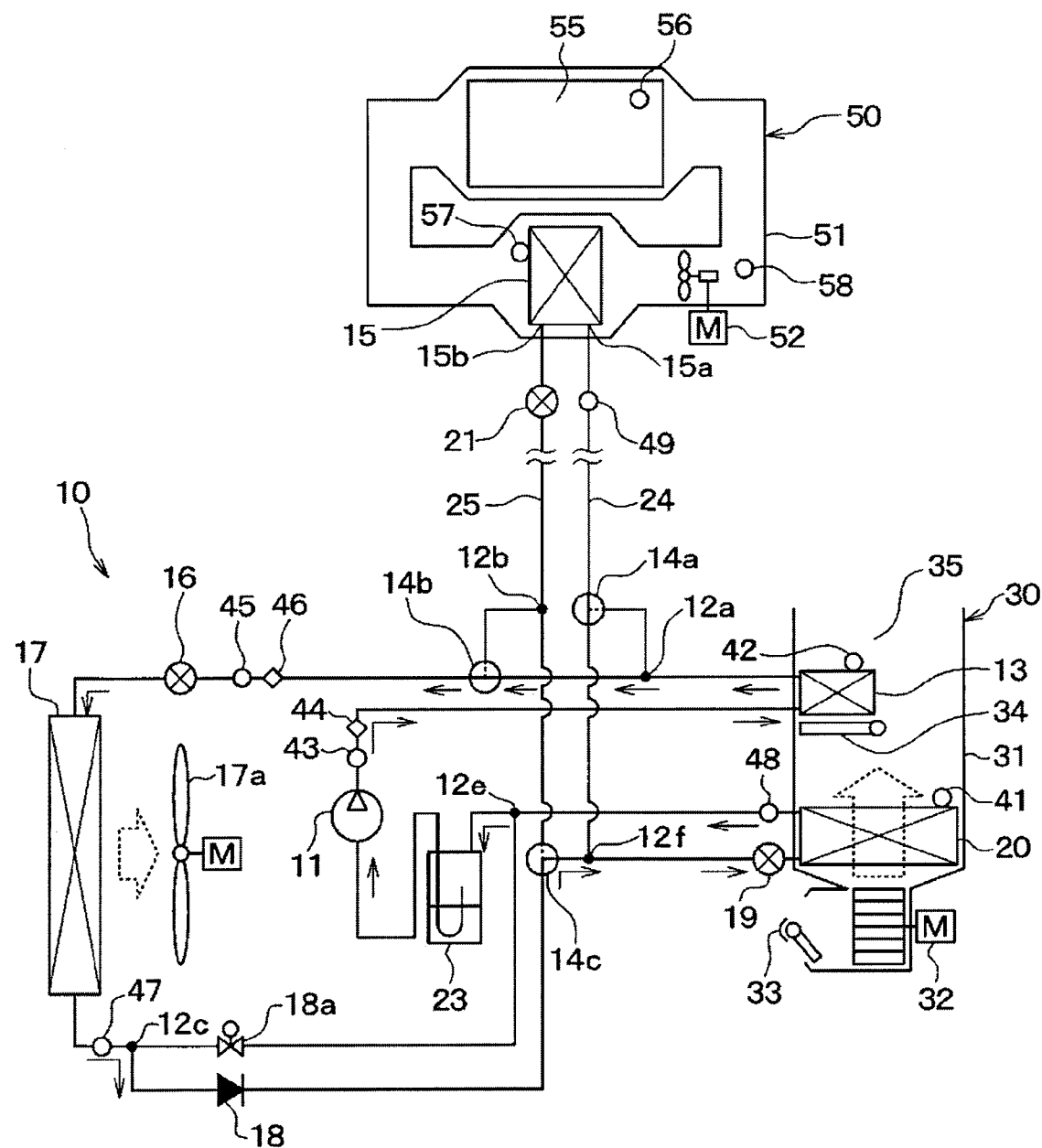
FIG. 16 is a diagram illustrating an overall configuration of a refrigerant flow in a cooling operation mode of the refrigeration cycle device according to the fourth embodiment.

That is, as shown in FIGS. 15 and 16, in the configuration of the refrigeration cycle device 10 of the first embodiment, the fourth connection portion 12d is changed into the third three-way valve 14c and the sixth connection portion 12f is changed to be connected at a position between the inlet side of the interior evaporator 20 and the third three-way valve 14c.

The third three-way valve 14c switches a refrigerant passage for connecting the refrigerant outlet of the exterior heat exchanger 17 and the auxiliary heat exchanger 15 and a refrigerant passage for connecting the refrigerant outlet of the exterior heat exchanger 17 and the interior evaporator 20. Thus, the third three-way valve 14c forms a refrigerant passage switching portion. The other configurations are the same as those of the first embodiment.

Next, a main difference between the present embodiment and the first embodiment will be described with respect to the operation of each operation mode.

In the cooling/battery cooling operation mode, the controller operates the third three-way valve 14c such that the refrigerant outlet of the exterior heat exchanger 17 is connected to the auxiliary heat exchanger 15. The operations of the other control target devices are the same as those in the first embodiment. Consequently, the refrigeration cycle device 10 can switch over to a refrigerant passage in which the refrigerant flows as indicated by the arrow in FIG. 15.

In this case, in the refrigerant cycle device 10 of the fourth embodiment, the refrigerant in the range reaching the inlet side of the interior evaporator 20 from the outlet side of the exterior heat exchanger 17 flows into the auxiliary heat exchanger 15 through the second pipe 25 and the refrigerant flowing out of the auxiliary heat exchanger 15 flows to the inlet side of the interior evaporator 20 of the suction ports of the compressor 11 through the first pipe 24. That is, when the refrigerant passage switching portion switches over to the second refrigerant passage, the interior evaporator 20 is arranged in series downstream of the auxiliary heat exchanger 15 in the refrigerant flow direction. In addition, the above configuration and operation are the same in the battery cooling operation mode and the heating/battery cooling operation mode.

In the cooling operation mode, the controller operates the third three-way valve 14c such that the refrigerant outlet of the exterior heat exchanger 17 is connected to the refrigerant inlet of the interior evaporator 20. The operations of the other control target devices are the same as those in the first embodiment. Consequently, the refrigeration cycle device 10 can switch over to a refrigerant passage in which the refrigerant flows as indicated by the arrow in FIG. 16.

The fourth embodiment has the effects (1) to (4) of the first embodiment.

Fifth Embodiment

In the first embodiment, the refrigeration cycle device 10 is configured such that when the refrigerant passage switching portion switches over to the first refrigerant passage, the auxiliary heat exchanger 15 is arranged in series downstream of the interior condenser 13 in the refrigerant flow direction, as in the heating/battery heating operation mode. On the other hand, in a fifth embodiment, the refrigeration cycle device 10 is configured such that the interior condenser 13 and the auxiliary heat exchanger 15 are connected in parallel.

Figure 17:
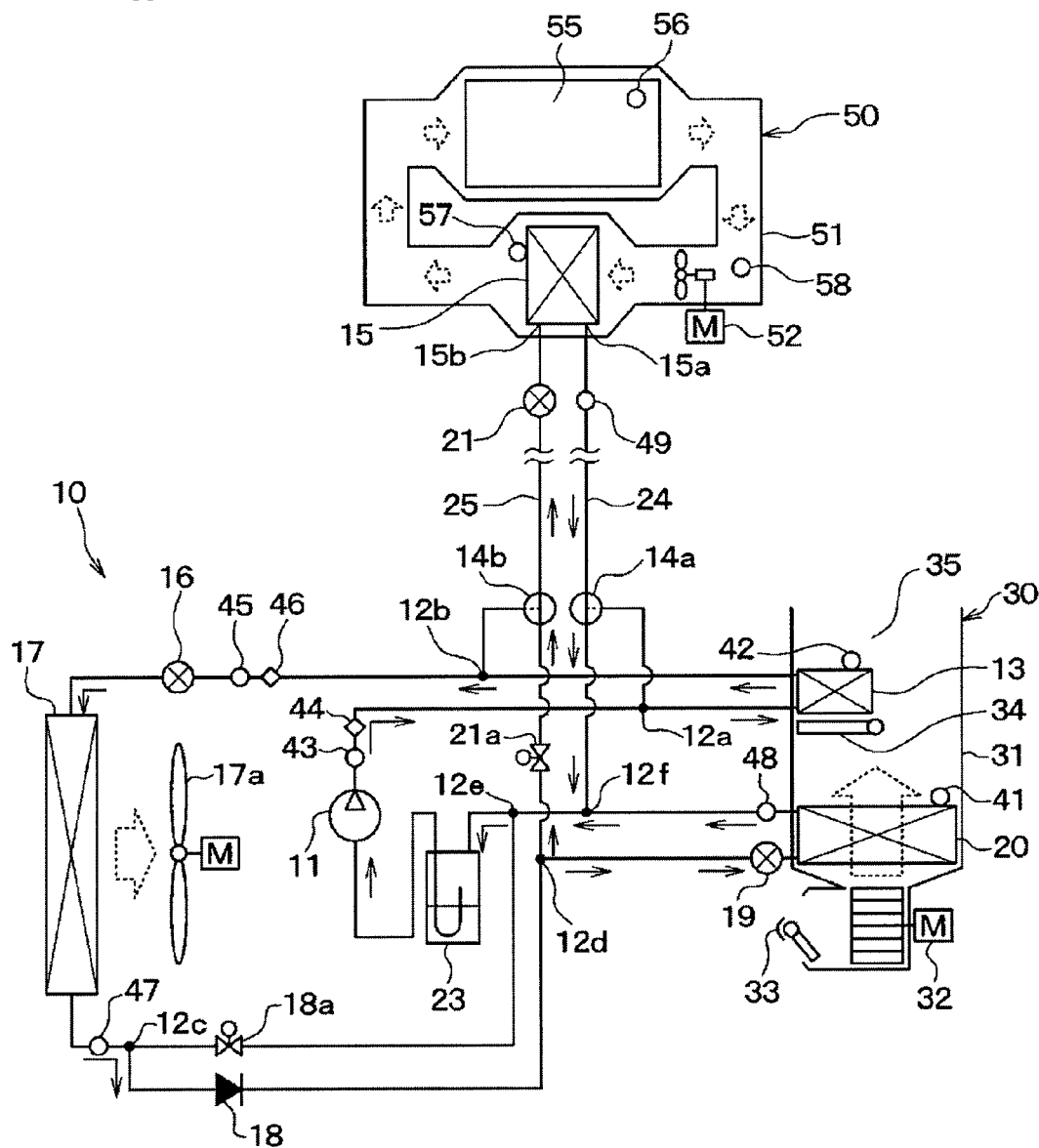
FIG. 17 is a diagram illustrating an overall configuration of a refrigerant flow in a cooling/battery cooling operation mode of a refrigeration cycle device according to a fifth embodiment.
Figure 18:
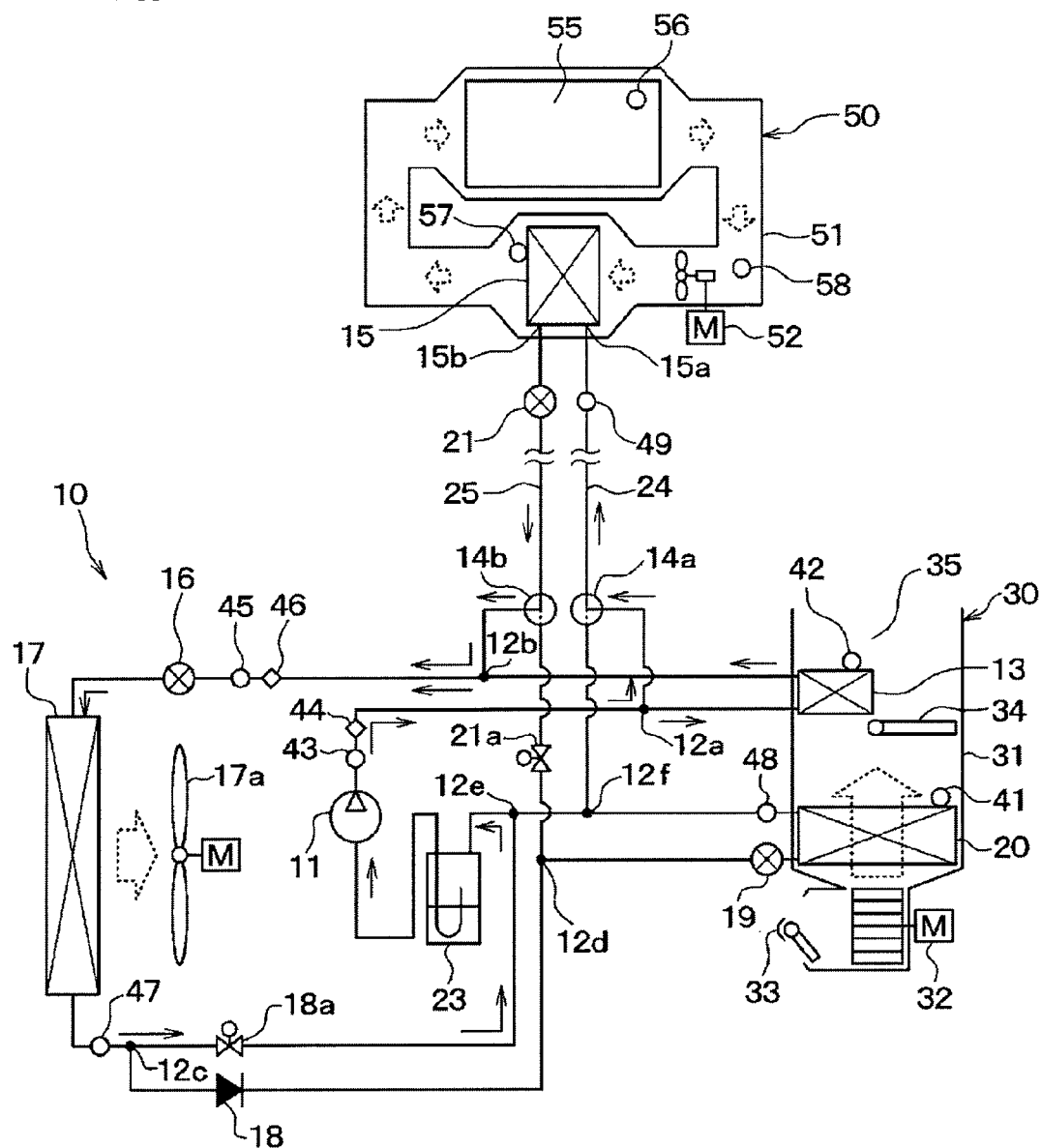
FIG. 18 is a diagram illustrating an overall configuration of a refrigerant flow in a heating/battery heating operation mode of the refrigeration cycle device according to the fifth embodiment.

That is, as shown in FIGS. 17 and 18, in the configuration of the refrigeration cycle device 10 of the first embodiment, the first connection portion 12a is changed to be connected at a position between the discharge port side of the compressor 11 and the inlet side of the interior condenser 13. In addition, the second connection portion 12b and the second three-way valve 14b are changed to each other.

The second three-way valve 14b switches a refrigerant passage for connecting the second pipe 25 and the second connection portion 12b (the refrigerant inlet side of the exterior heat exchanger 17) and a refrigerant passage for connecting the second pipe 25 and the fourth connection portion 12d (the refrigerant outlet side of the exterior heat exchanger 17). The other configurations are the same as those of the first embodiment.

Next, a main difference between the present embodiment and the first embodiment will be described with respect to the operation of each operation mode.

In the cooling/battery cooling operation mode, the controller operates the second three-way valve 14b such that the second pipe 25 is connected to the fourth connection portion 12d. The operations of the other control target devices are the same as those in the cooling/battery cooling operation mode of the first embodiment. Consequently, the refrigeration cycle device 10 can switch over to a refrigerant passage in which the refrigerant flows as indicated by the arrow in FIG. 17.

In the heating/battery heating operation mode, the controller operates the second three-way valve 14b such that the second pipe 25 is connected to the second connection portion 12b. The operations of the other control target devices are the same as those in the heating/battery heating operation mode of the first embodiment. Consequently, the refrigeration cycle device 10 can switch over to a refrigerant passage in which the refrigerant flows as indicated by the arrow in FIG. 18.

In this case, in the refrigerant cycle device 10, the refrigerant in the range reaching the inlet side of the interior condenser 13 from the discharge port side of the compressor 11 flows into the auxiliary heat exchanger 15 through the first pipe 24 and the refrigerant flowing out of the auxiliary heat exchanger 15 flows to the inlet side of the exterior heat exchanger 17 through the second pipe 25. That is, when the refrigerant passage switching portion switches over to the first refrigerant passage, the interior condenser 13 and the auxiliary heat exchanger 15 are connected in parallel.

Accordingly, according to the refrigerant cycle device 10 of the fifth embodiment, the heating of the secondary battery 55 can be instantly performed by the high-pressure refrigerant immediately after being discharged from the compressor 11. The fifth embodiment has the effects (1) to (3) and (5) of the first embodiment.

Other Embodiment

The disclosure is not limited to the above-mentioned embodiments and the following changes may be made without departing from the principles and spirit of the disclosure.

(1) Although the four-way valve 26 is used as the communication state switching portion which switches the communication states between the refrigerant inlet 15c and the refrigerant outlet 15d of the auxiliary heat exchanger 15 and the first and second pipes 24 and 25 in the second embodiment, other configuration may be used. For example, refrigerant passages for respectively connecting the refrigerant inlet 15c and the refrigerant outlet 15d and the first and second pipes 24 and 25 and an opening and closing device for opening and closing each refrigerant passage may be used.

(2) Although the electric expansion valve is used as the heating expansion valve 13 in each of the above embodiments, a fixed throttle such as a capillary may be used in place of the electric expansion valve. In this case, a bypass path in which a refrigerant bypasses the heating expansion valve 13 and flows and an on/off valve for opening and closing the bypass path are provided. When the cooling operation mode is performed, the refrigerant bypasses the heating expansion valve 13 and flows by opening the on/off valve. Similarly, a fixed throttle may be used as the heating expansion valve 19 in place of the electric expansion valve.

(3) The secondary battery 55 is cooled or heated by cooling or heating the battery air (second temperature regulation target) using the auxiliary heat exchanger 15 in each of the above embodiments. However, the secondary battery 55 may be cooled or heated in such a manner that the auxiliary heat exchanger is configured of a water-refrigerant heat exchanger and water is cooled or heated by the auxiliary heat exchanger. In this case, the water is a second temperature regulation target. In addition, the auxiliary heat exchanger may be configured such that heat is directly exchanged between the refrigerant and the secondary battery 55. In this case, the second battery 55 is a second temperature regulation target.

(4) Although each of the above embodiments describes an example in which the refrigeration cycle device 10 is applied to the electric vehicle, the refrigeration cycle device 10 may be applied to a typical vehicle obtaining driving force for traveling the vehicle from the internal combustion engine or a hybrid vehicle obtaining driving force for traveling the vehicle from both of the internal combustion engine and the electric motor. When the refrigeration cycle device 10 is applied to the vehicle having the internal combustion engine, a heater core for heating inside air using coolant of the internal combustion engine as a heat source may be provided.

(5) Although the second temperature regulation target is the battery air blown to the secondary battery 55 in each of the above embodiments, the second temperature regulation target may be vehicle interior air blown to the space of the vehicle interior. In this case, for example, it may be possible to cool or heat vehicle interior air blown to a front seat of the vehicle interior by the interior evaporator 20 and to cool or heat vehicle interior air blown to a rear seat of the vehicle interior by the auxiliary heat exchanger 15. Thereby, cooling or heating at the rear seat may be achieved as a dual air conditioner using a heat pump.

(6) Although each of the above embodiments describes an example in which the inside air blown to an air conditioning target space as the first temperature regulation target is heated or cooled, the first temperature regulation target is not limited thereto. For example, drinking water or living water may be adopted as the first temperature regulation target. Although each of the above embodiments describes an example in which the secondary battery 55 is cooled or heated by cooling or heating the second temperature regulation target, cooling or heating of vehicle mounting devices required for cooling or heating may be performed in an optimal temperature range before ignition, immediately after ignition, or during traveling. For example, an internal combustion engine (engine), an electric motor, an inverter, a transmission, etc. may be cooled or heated.

(7) Although the refrigeration cycle device 10 is applied to the vehicle in each of the above embodiments, the refrigeration cycle device 10 may be applied besides the vehicle. For example, the first temperature regulation target may be air blown to the interior and the second temperature regulation target may be a heating medium for performing temperature regulation of a generator.

(8) Although the present disclosure has been described with respect to the specific embodiments, it will be apparent to those skilled in the art that various changes and modifications may be made without departing from the spirit and scope of the disclosure as defined in the following claims. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigeration cycle device comprising:
a compressor compressing and discharging a refrigerant;
an exterior heat exchanger exchanging heat between the refrigerant discharged from the compressor and outside air, such that the refrigerant is capable of flowing from the exterior heat exchanger to a suction port of the compressor;
a utilization-side heat exchanger exchanging heat between one of the refrigerant discharged from the compressor and the refrigerant flowing out of the exterior heat exchanger and a first temperature regulation target;
an auxiliary heat exchanger exchanging heat between a refrigerant and a second temperature regulation target;

a first pipe communicating with the auxiliary heat exchanger, and having a larger passage cross-sectional area than a predetermined value;

a second pipe communicating with the auxiliary heat exchanger, and having a smaller passage cross-sectional area than that of the first pipe; and a refrigerant passage switching portion switching a refrigerant passage of the refrigerant circulated in a cycle, wherein the refrigerant passage switching portion is configured at least to switch (i) a first refrigerant passage, in which a gas-liquid refrigerant directed to an inlet of the exterior heat exchanger from a discharge port of the compressor flows into the auxiliary heat exchanger through the first pipe and a liquid refrigerant flowing out of the auxiliary heat exchanger flows to the inlet of the exterior heat exchanger through the second pipe, and (ii) a second refrigerant passage, in which a liquid refrigerant directed to the suction port of the compressor from an outlet of the exterior heat exchanger flows into the auxiliary heat exchanger through the second pipe and a gas refrigerant flowing out of the auxiliary heat exchanger flows to the suction port of the compressor through the first pipe, wherein a direction of the gas-liquid refrigerant flowing through the first pipe in the first refrigerant passage is reverse to a direction of the gas refrigerant flowing through the first pipe in the second refrigerant passage, and a direction of the liquid refrigerant flowing through the second pipe in the first refrigerant passage is reverse to a direction of the liquid refrigerant flowing through the second pipe in the second refrigerant passage.

2. The refrigeration cycle device according to claim 1, further comprising a radiating heat exchanger that is provided as the utilization-side heat exchanger, to radiate heat by exchanging heat between the refrigerant discharged from the compressor and the first temperature regulation target such that the refrigerant is capable of flowing from the radiating heat exchanger to the inlet of the exterior heat exchanger, wherein when the first refrigerant passage is switched, a refrigerant in a region reaching the inlet of the exterior heat exchanger from an outlet of the radiating heat exchanger flows into the auxiliary heat exchanger through the first pipe and a refrigerant flowing out of the auxiliary heat exchanger flows to the inlet of the exterior heat exchanger through the second pipe.

3. The refrigeration cycle device according to claim 1, wherein the auxiliary heat exchanger has a refrigerant inlet through which a refrigerant is introduced and a refrigerant outlet through which a refrigerant is discharged, the refrigerant passage switching portion has a communication state switching portion that switches (i) a first communication state, in which the refrigerant inlet of the auxiliary heat exchanger communicates with the first pipe and the refrigerant outlet of the auxiliary heat exchanger communicates with the second pipe, and (ii) a second communication state in which the refrigerant inlet of the auxiliary heat exchanger communicates with the second pipe and the refrigerant outlet of the auxiliary heat exchanger communicates with the first pipe, and the communication state switching portion allows the first communication state when the first refrigerant passage is switched, and allows the second communication state when the second refrigerant passage is switched, the refrigeration cycle device further comprising a pressure reducer arranged between the refrigerant inlet of the auxiliary heat exchanger and the communication state switching portion to decompress the refrigerant flowing into the refrigerant inlet of the auxiliary heat exchanger.

4. The refrigeration cycle device according to claim 1, further comprising:

a first pressure reducer arranged between the auxiliary heat exchanger and the first pipe to decompress the refrigerant flowing into the auxiliary heat exchanger; and the pressure reducer further arranged between the auxiliary heat exchanger and the second pipe to decompress the refrigerant flowing into the auxiliary heat exchanger.

5. The refrigeration cycle device according to claim 2, wherein the auxiliary heat exchanger has a refrigerant inlet through which a refrigerant is introduced and a refrigerant outlet through which a refrigerant is discharged, the refrigerant passage switching portion has a communication state switching portion that switches (i) a first communication state, in which the refrigerant inlet of the auxiliary heat exchanger communicates with the first pipe and the refrigerant outlet of the auxiliary heat exchanger communicates with the second pipe, and (ii) a second communication state in which the refrigerant inlet of the auxiliary heat exchanger communicates with the second pipe and the refrigerant outlet of the auxiliary heat exchanger communicates with the first pipe, and the communication state switching portion allows the first communication state when the first refrigerant passage is switched, and allows the second communication state when the second refrigerant passage is switched, the refrigeration cycle device further comprising a pressure reducer arranged between the refrigerant inlet of the auxiliary heat exchanger and the communication state switching portion to decompress the refrigerant flowing into the refrigerant inlet of the auxiliary heat exchanger.

6. The refrigeration cycle device according to claim 1, wherein in the first refrigerant passage, a gas-liquid refrigerant directed to the inlet of the exterior heat exchanger from the discharge port of the compressor flows into the auxiliary heat exchanger through the first pipe and a liquid refrigerant flowing out of the auxiliary heat exchanger flows to the inlet of the exterior heat exchanger through a pressure reducer and the second pipe, and in the second refrigerant passage, a liquid refrigerant directed to the suction port of the compressor from the outlet of the exterior heat exchanger flows into the auxiliary heat exchanger through the second pipe and the pressure reducer and a gas refrigerant flowing out of the auxiliary heat exchanger flows to the suction port of the compressor through the first pipe.

7. The refrigeration cycle device according to claim 6, wherein a flow direction of a gas refrigerant in the first pipe and a flow direction of a liquid refrigerant in the second pipe in the first refrigerant passage are opposite from a flow direction of a gas refrigerant in the first pipe and a flow direction of a liquid refrigerant in the second pipe in the second refrigerant passage, respectively, a liquid refrigerant in the second pipe in the first refrigerant passage and a liquid refrigerant in the second pipe in the second refrigerant passage are decompressed through the pressure reducer, and the pressure reducer is common in the first refrigerant passage and in the second refrigerant passage.

8. The refrigerant cycle device according to claim 1, wherein a direction of the gas-liquid refrigerant or the liquid refrigerant flowing through the auxiliary heat exchanger in the first refrigerant passage is reverse to a direction of the liquid refrigerant flowing through the auxiliary heat exchanger in the second refrigerant passage.

9. The refrigerant cycle device according to claim 1 further comprising a first three-way valve in fluid communication with the first pipe and a second three-way valve in fluid communication with the second pipe.

10. The refrigerant cycle device according to claim 1 wherein refrigerant flows into the utilization-side heat exchanger prior to the auxiliary heat exchanger in the first refrigerant passage and flows into the auxiliary heat exchanger prior to the utilization-side heat exchanger in the second refrigerant passage.

* * * * *